United States Patent [19]
Karlen et al.

[11] Patent Number: 5,155,423
[45] Date of Patent: Oct. 13, 1992

[54] INDUSTRIAL ROBOT WITH SERVO

[75] Inventors: James P. Karlen, Bethel; Jack M. Thompson, Jr., Cincinnati; Keith A. Kowalski, Cincinnati; John Bockhold, Cincinnati; David Damico, Lebanon, all of Ohio

[73] Assignee: Robotics Research Corporation

[21] Appl. No.: 330,391

[22] Filed: Mar. 29, 1989

Related U.S. Application Data

[63] Continuation-in-part of Ser. No. 830,659, Feb. 18, 1986, abandoned.

[51] Int. Cl.⁵ ............................................. G05B 13/02
[52] U.S. Cl. ......................... 318/568.11; 318/568.10; 318/568.13; 364/513; 901/15; 901/24; 901/28
[58] Field of Search .................................. 318/560–636; 364/513; 901/3, 9, 11, 12–33

[56] References Cited

U.S. PATENT DOCUMENTS

| | | | |
|---|---|---|---|
| 4,398,110 | 8/1983 | Flinchbaugh et al. | 901/23 X |
| 4,425,818 | 1/1984 | Asada et al. | 318/568.11 X |
| 4,512,710 | 4/1985 | Flatau | 318/568.11 X |
| 4,518,308 | 5/1985 | Grzybowski et al. | 901/28 X |
| 4,547,119 | 10/1985 | Chance et al. | 901/18 X |
| 4,552,504 | 11/1985 | Nakada et al. | 901/15 X |
| 4,608,651 | 8/1986 | Murakami et al. | 901/15 X |
| 4,645,409 | 2/1987 | Gorman | 318/568.11 X |
| 4,651,591 | 3/1987 | Wurst | 901/26 X |
| 4,662,814 | 5/1987 | Suzuki et al. | 901/28 X |
| 4,678,952 | 7/1987 | Peterson et al. | 901/29 X |
| 4,766,775 | 8/1988 | Hodge | 901/15 X |
| 4,900,997 | 2/1990 | Durand et al. | 318/568.11 X |
| 4,922,782 | 5/1990 | Kawai | 901/23 X |
| 4,972,735 | 11/1990 | Torii et al. | 901/29 X |

*Primary Examiner*—Paul Ip
*Attorney, Agent, or Firm*—Jones, Day, Reavis & Pogue

[57] ABSTRACT

A digitally controlled industrial robot comprises a set of unitized and integrated joint drive modules which can be assembled in series to form an arm. The joints are of two basic types, pitch joints and roll joints, with the roll joints providing rotation about the longitudinal axis of the manipulator and the pitch joints providing rotation about axes which are substantially perpendicular to and offset from the roll joint axes. Any number of joints may be assembled to comprise the manipulator, permitting the configuration of a kinematically redundant manipulator. A servocontrol derives feedback from sensing the motive force on a driven member and compensates the drive signal accordingly. More particularly, the torque exerted on each roll and pitch joint is measured and used for feedback to provide stability and optimum bandwidth for the servomechanism.

55 Claims, 14 Drawing Sheets

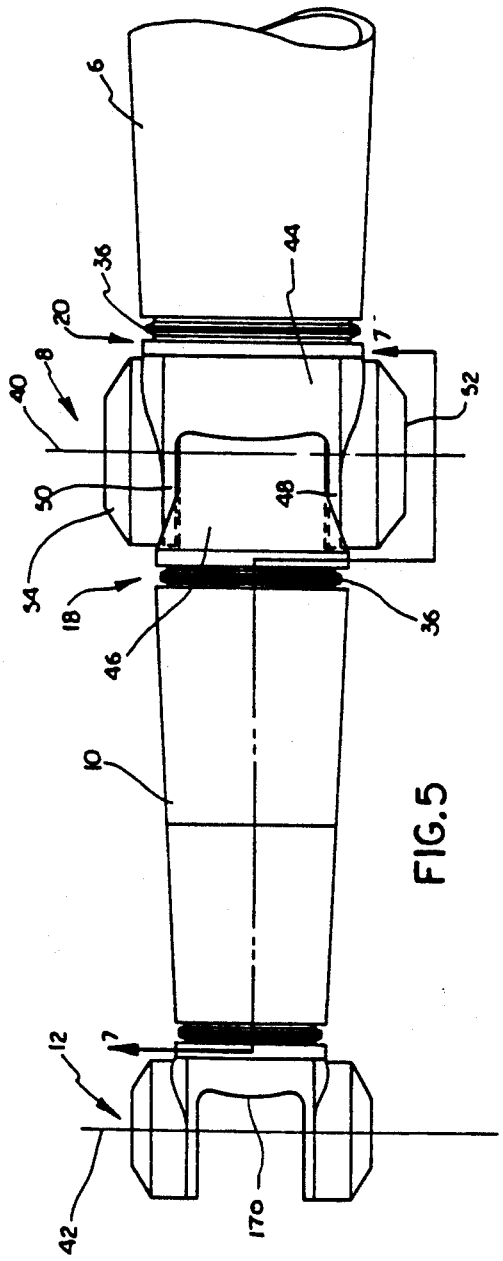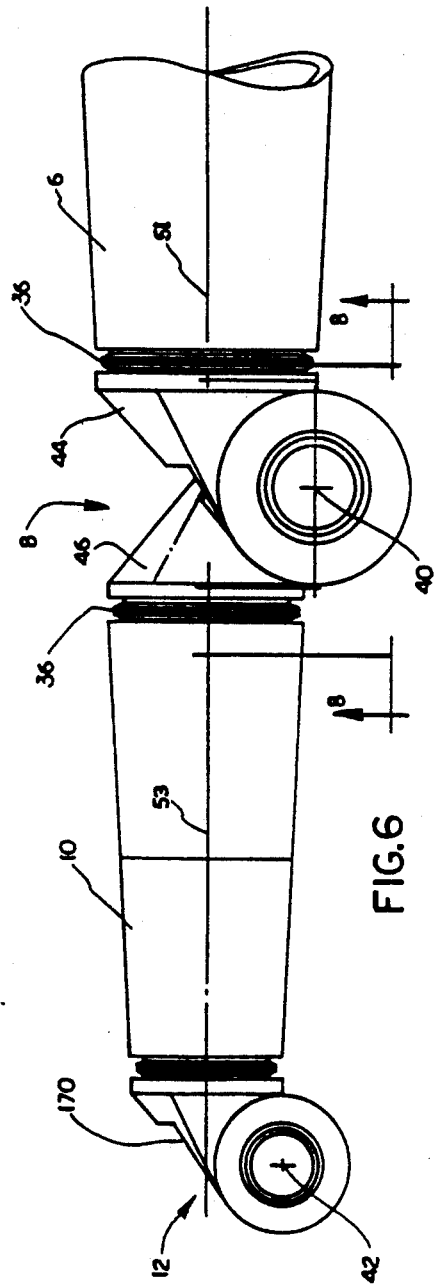

INDUSTRIAL ROBOT WITH SERVO

This application is a continuation-in-part of application Ser. No. 06/830,659, filed Feb. 18, 1986.

BACKGROUND OF THE INVENTION

The present invention relates to industrial robots or computer-controlled manipulators and, more particularly, to the design and control of an articulated mechanical arm of an indeterminant number of axes, capable of being configured with kinematic redundancy.

Industrial robot arm designs have followed a few basic types. Industrial robots can be classified according to their mechanical linkage geometries, i.e., the particular arrangement of structural elements and joints which connect them and the associated motion control systems required to coordinate joint action to produce straight line motion and other controlled paths at the toolpoint. In the most general purpose and versatile manipulators, six degrees of freedom are incorporated in the linkage configuration to provide complete control of the position in space and orientation of the tool mounted at the end of the manipulator.

One elementary form of manipulator employs a set of three slides connected at prismatic or sliding joints. These slides are disposed in a nominally orthogonal arrangement to position the "wrist" of the device, a second set of three orthogonally disposed rotational axes which determine tool orientation. This mechanism geometry provides a roughly rectilinear working volume. Such a device is typified by the IBM RS 1 robot. The "cartesian" geometry of such a device has a number of distinct advantages over other types. Most important of these is that no coordinate transformations are necessary to produce useful controlled motions at the toolpoint. Instead, linear and circular interpolation of the positioning axes is sufficient.

A second common mechanical geometry provides a wrist, as described above, linked to two slides which are disposed at a right angle and connected at a prismatic joint. These slides are affixed to a revolute joint in the base of the device which provides rotation about a vertical axis. The workspace of such a manipulator is roughly "cylnidrical" in shape. Such a device is typified by the Prab Model FA robot.

In a third common mechanical geometry, the wrist described above is positioned in space by a slide connected at a prismatic joint to a revolute joint which, in turn, is mounted at a right angle to and rotated around a vertical axis by a second revolute joint in the base of the device. Theoretically, this type of "polar" geometry produces a spherical work space. In practice, mechanical design considerations generally restrict the useful workspace to a spherical shell less certain significant conical sections. Such a device is typified by the Unimation Unimate 1000 robot.

More sophisticated motion control systems are required for arms with cylindrical and polar linkage geometries than for arms with cartesian geometries because coordinate transformations must be performed to generate straight line movements at the toolpoint. However, as a class, manipulators which employ one or more slides connected at prismatic joints exhibit certain significant performance limitations. These are due, in part, to the relatively large size and high weight, and the resulting high motive power required of such a design to convey and locate in space a tool or workpiece of a given mass. They are also due to the fact that the positioning slides often interfere with other objects in and around the working area, including the workpiece itself.

Of the manipulator types described above, the cartesian systems tend to be the least spatially efficient linkage configurations, since the workspace is often completely surrounded by a large framework of positioning slides and supporting structure. Of the group described above, the polar type, which employs only a single slide, is the most efficient and least intrusive in the workspace. To minimize the spatial efficiency problems, a few polar geometry devices have been designed in which the slide collapses upon itself when retracted to minimize interference problems. In one form, for example, a set of colinear slide segments telescope. This form is characterized by the Maker, which is manufactured by U.S. Robot. In another form, a thin-wall steel tube that forms the slide when extended is caused to collapse in section to a flat sheet which can be rolled onto a drum when retracted. This device is typified by the Martin Marietta/NASA Viking Lander arm. Mechanical implementations of these designs tend to have relatively poor static and dynamic performance characteristics, however, due either to the number of additional prismatic joints incorporated to provide telescoping or the very thin-wall slide cross-section.

To improve the performance and workspace interference characteristics of manipulators, a linkage geometry which permits considerably more efficient mechanical designs has been devised in which a series of rigid link segments connected by revolute joints is used to position the wrist. This is known as a revolute or jointed arm manipulator and is the type of the present invention. In a general-purpose manipulator of this type the wrist positioning mechanism typically consists of two links connected by a revolute joint, which a terminal end of one of these links mounted on a second revolute joint fixed in plane with the first, itself mounted at a right angle on and rotated about a vertical axis by a third revolute joint in the base. Manipulators which employ this linkage geometry are more like the human arm than the earlier designs described above, but function kinematically more like a "backhoe" than a human limb, since the linkage configuration operates in a fixed plane. Theoretically, such a jointed arm linkage geometry produces a spherical working envelope. Like cylindrical and polar geometry manipulators, the jointed arm manipulator requires a relatively complex controller which must perform coordinate transformations to produce straight lines or other controlled path behavior at the toolpoint. The principle advantages of the jointed arm manipulator geometry relate to the fact that when the arm linkage which positions the wrist is retracted, it folds upon itself, permitting arms to be relatively compact for a given working envelope and a light-weight for a given payload.

Two distinct mechanical embodiments of the jointed arm geometry have gained acceptance in the industry. In one, the actuators which drive many of the arm and wrist joints are mounted some distance from the joints themselves. In such designs, motors and gear reducers mounted at the "shoulder" transmit power to the joints through the effect of a four-bar linkage configuration or through pushrods and bellcranks, or by chains, timing belts, or other "tendon" arrangements. An example of such a device is the ASEA IRb 6 robot. This design has the advantage that the relatively bulky and heavy motors, drives, and velocity feedback hardware need not be packaged with and supported by the more distal arm structure. Consequently, motive power requirements for a given payload may be reduced. Nevertheless, the drive train which is employed to transmit power to a remote joint itself imposes a number of significant performance limitations. The feasible range of motion of joints is often limited by geometric range changes or over-center conditions in the power transmission mechanism, resulting in arm assemblies with relatively restricted, toroidal working envelopes. Transmission mechanisms also add considerable inertia, compliance and mechanical inaccuracy to the drive train, to the detriment of static and dynamic performance. Moreover, since the transducer which is used to determine toolpoint position is often mounted at the origin of the transmission, compliance and mechanical inaccuracy in the transmission significantly reduces the precision of the device.

In the second common embodiment of the jointed arm linkage geometry, substantially all of the actuators which drive the arm and wrist joints are located on or within the arm structure adjacent the joints. In some cases, actuators are located directly at the joints; in other cases, they are located in adjacent "in-board" link segments. This arrangement overcomes the problem of limited joint travel and, as a result, certain mechanisms of this type exhibit useful working envelopes that approach a sphere. The joint-mounted or link-mounted drive design also reduces or eliminates problems associated with power transmission inertial and compliance. An example of such a device is the Unimation PUMA 600 robot.

Although jointed arm geometry provides a more efficient operation than cartesian or polar configurations in terms of maneuverability, working envelope, and overall dexterity, it requires a more sophisticated controller, capable of performing elaborate and time-consuming coordinate transformations to position the toolpoint. The relative complexity and high cost of computer control systems required for accurate and, to an increasing extent, adaptive control of the toolpath in jointed-arm manipulators have had a significant influence on the particular linkage geometries utilized in most commercial arm designs. Linkage designs have generally been adopted which simplify the process of coordinate transformation and reduce the number and rate of computations that must be performed. For example, common jointed-arm linkage geometries avoid "off-set" pitch points, a feature which greatly complicates transformation. Thus, by imposing specific constraints on the linkage geometry, explicit mathematical expressions (i.e. closed form, analytic expressions) can be obtained for the coordinate transformations which simplify the control system.

However, such efforts to constrain mechanical design for the sake of control system efficiency exhibit several shortcomings. The linkage geometries that allow for explicit solutions to the transformation equations often are not optimal for performance and cost. In addition, explicit expressions can not be easily adjusted for mechanical imprecisions in the manipulator. Moreover, it is doubtful that any closed form solution exists for the transformation equations of any redundant manipulator. Furthermore, intrinsic to all jointed arm manipulators is a condition known as a singularity. Conventional control systems and manipulators will encounter regions in their working envelope containing "singularities" which prevent effective operation of the controller. Conventional controllers are unable to operate efficiently when sets of singularities are encountered in the work envelope because the equations typically used to control motion have no mathematical solution at a singularity. Thus, while many mechanical designs have been influenced by an effort to simplify the mathematics associated with the control of the manipulator, mathematical control problems persist. In accordance with the present invention, it has been found to be better to adopt an optimum mechanical design, unconstrained by concerns about mathematical complexity, and to confront the mathematical problems of coordinate transformation, redundancy, singularities and mechanical imprecisions by the adoption of iterative control methods.

In addition to the four basic types of general-purpose manipulator described above, each of which provides six degrees of freedom at the toolpoint, many other linkage geometries have been devised for special applications. In the design of most of such special-purpose arms, an effort is made to employ a linkage geometry having the minimum number of drive joints necessary to perform the particular task of that application. Significant cost savings result from such an effort through a reduction both in the number and size of structural components, motors, power supplies, servo feedback hardware and in the complexity of the control system required. Special-purpose manipulator designs have evolved, for example, for the relatively simple kinematic function of loading and unloading workpieces from lathes. One type employs a two-axis, cartesian mechanism in which the primary slide is mounted parallel to the lathe spindle centerline. A second common type uses two links connected at revolute joints, plus one short slide, to handle short chucked parts. Because of their uniquely tailored mechanical designs, neither of these specialized manipulators requires the controller to perform coordinate transformations. In both, the orientation of the linkage geometry itself produces appropriate tool paths for the given application when each joint is driven independently in the proper sequence. With such designs it is possible that the joints may not require an analog servocontrol network.

As a second example, it has been determined that for a large class of MIG welding operations in the factory, control of rotation of the welding tip about its axis is not necessary and consequently, that a three-axis arm with a two-axis wrist provides sufficient tool control. Many other examples exist of manipulator designs being optimized for a specific task or class of tasks. In most cases, a geometry providing less than six degrees of freedom at the tool is employed and the physical sizes of the links and/or slides, as well as their load capacities, are matched to the specific application. Accordingly, a unique design is required for each such specialized application.

Previous manipulator designs exhibit a number of significant limitations and shortcomings in addition to those mentioned above. Jointed arm manipulators, incorporating six revolute joints and providing six degrees of freedom at the toolpoint, while more efficient than other general-purpose linkage configurations, are substantially less maneuverable and dexterous than biological analogs they ideally would emulate, notably the human arm or an elephant trunk. As previously stated, present jointed arm devices function much like backhoes, from a kinematic viewpoint, in that the arm linkage operates in a fixed plane which is rotated about one major vertical axis by the base revolute joint. With most of such devices, a given location and orientation of the tool corresponds to a single discrete set of joint angles and an associated discrete arm configuration. In a few of such devices, a given position and orientation of the tool can be achieved by two discrete arm configurations. An example of a device with two possible arm configurations for a single toolpoint position is the Unimation PUMA 600. In that device, while the revolute joints remain in a fixed plane, the "elbow" joints can be disposed either "up" or "down". Nevertheless, if for a prescribed position of the tool, an obstacle in the workspace interferes or the workpiece itself interferes with the arm segments, the arm is not capable of reaching the point without collision. Unlike the human arm, such conventional jointed arm manipulators do not have sufficient degrees of freedom to reach around the interfering object. This limitation is illustrated in FIG. 11. The human arm is considered to have seven degrees of freedom from shoulder to wrist, providing a range of elbow attitudes and resulting arm configurations for given hand position and orientation. The elephant trunk, having more than seven degrees of freedom, can assume more complex configurations, and can "snake" between objects. Many automation tasks demand the dexterity of a human arm; some require even greater freedom of action. The lack of arm maneuverability and tool-handling dexterity in existing general-purpose computer-controlled manipulators presents serious limitations in their performance and adaptability to numerous applications.

The addition of one or more "redundant" joints in a manipulator has a number of significant benefits beyond improved maneuverability. In the same way that an extra degree of freedom provides means to reconfigure the arm to reach around an obstacle, the arm can be reconfigured to dispose joints in a way which distributes torque or velocity requirements among arm joints in the most equitable manner. A man reconfigures his arm in the process of lifting a heavy object to keep the forces and moments applied to each and every joint at a minimum. The man uses the redundancy in his arm to maximize "leverage". In a six degree of freedom jointed arm, operating in plane like a backhoe, no such reconfiguration and redistribution of forces and torques is possible. Thus, the mechanism's lifting capacity, associated with any particular point in its working envelop and discrete arm configuration, may be unreasonably limited because only a few joints are contributing to the exercise. With a kinematically-redundant manipulator, in contrast, while it may not be possible to lift a given load with one configuration of joints, it may be possible with another configuration and the arm can be reconfigured to do so. Similarly, in executing a high-speed move, the peak toolpoint velocity attainable by a six degree of freedom arm is ultimately determined at any one point in the path trajectory by the maximum speed of one joint. In a six degree of freedom arm, the motion requirements at any one point in the path again may not be well distributed among the joints, but no reconfiguration and redistribution is possible. The addition of redundant joints, therefore, promises to enhance greatly the efficiency of the manipulator, providing increased pay load and applied tool force, as well as increased toolpoint speed, for a given amount of motive power and length of arm.

Another problem intrinsic to six degree of freedom arms which may be reduced by kinematic redundancy is related to joint travel limits. In the majority of mechanical embodiments of jointed arms, few, if any, of the revolute joints provide more than one full rotation. Many typical joints provide no more than 180 degrees of rotation. This feature limits the ability of the arm to accomplish certain motions. For example, if the prescribed path of movement specifies certain tool orientations, such as an orientation perpendicular in three axes to some arbitrary straight line in the workspace, then at some point in the straight line trajectory, one of the joints in the arm will reach its limit of travel and the desired path can be followed no further. This may be the case even when other joints remain close to their centers of travel. Kinematic redundancy provides a means to redistribute motion requirements in such a way as to maximize the use of all individual joint travel limits, thereby increasing the effective working envelop and tool-handling dexterity of the manipulator.

The implementation of kinematic redundancy in manipulator mechanisms can take many forms. Indeed, it can be achieved by the addition of one addition joint of any type at any location in any six degree of freedom arm linkage. Two colinear revolute joints in series will suffice. Such an additional degree of freedom need not be controlled in real time to achieve kinematic redundancy. A conventional manipulator providing six degrees of freedom under simultaneous control mounted on a slide that indexes the arm to different fixed positions during operation on the workpiece, offers a sort of primitive redundancy. However, in order to achieve human-arm-like dexterity from a conventional six degree of freedom general-purpose jointed arm manipulator, an additional revolute joint may be inserted between the shoulder "pitch" joint and the elbow "pitch" joint to allow the rotational axes of those two joints to move out of plane with respect to one another. This permits the elbow to be rotated out of plane, or "orbited", as shown in FIG. 13, providing the freedom to avoid obstacles and reach goalpoints on the back side of objects in the workspace, as shown in FIG. 12. In many accepted jointed arm designs, such as the ASEA IRb robots, the transmission linkages which are employed to transmit power to the remote arm joints make it difficult, if not impossible, to incorporate such a roll joint in the upper arm segment.

In order to achieve "intelligent", human-arm-like behavior with a kinematically-redundant arm, real-time sensory-interactive control is necessary. Such adaptive control of kinematic redundancy in manipulators demands that all of the seven or more joints be operated simultaneously and in concert by a real-time motion planning controller in response to information about internal arm conditions and to information from higher control levels and "off-board" sensors. The motion controller must handle both trajectory planning and coordinated joint control. It should reduce a programmed goalpoint to a set of coordinated joint commands, in real-time.

Conventional jointed arm robots also typically suffer certain significant limitations in performance related to the control stability and precision of movement of the manipulator. Many designs fail to provide servocontrol techniques which allow the high accuracy, repeatability and precision of movement required for applications such as metrology or assembly of small parts. The servocontrol systems of such manipulator may have limited operational bandwidth or may fail to employ important feedback control capabilities. As previously noted, some jointed arm designs incorporate mechanical features that further degrade stability and precision resulting from resulting from drive train compliance, structural compliance, and mechanical inaccuracies which are not effectively controlled by conventional machine tool servocontrol systems.

SUMMARY OF THE INVENTION

It is an object of the present invention to provide a manipulator with an arm geometry suitable for both a general-purpose and a variety of special-purpose applications. It is a related object to provide an easily servicable modular manipulator design with standardized interchangeable arm segments which may be combined in various ways to construct manipulators of various sizes and load capacities. It is also a related object to provide a self-contained, durable manipulator capable of operating in crowded environments, harsh environments, and highly sanitized environments.

It is a further object of the present invention to provide a general-purpose manipulator with improved maneuverability, dexterity and repeatability. More specifically, it is an object to provide a manipulator and controller which may be configured to operate with seven or more axes, undettered by the control problems which are introduced by kinematic redundancy. An allied object is to provide a manipulator with improved accuracy and repeatability.

In addition, it is also an object of the present invention to provide a manipulator and servocontrol which provide improved responsiveness of operation and smoothness of motion, enabling greater tool path speed and accuracy of movement.

Additional objects, advantages and novel features of the invention will be set forth in part in the description which follows, and in part will become apparent to those skilled in the art upon examination of the following, or may be learned by practice of the invention. The objects and advantage of the invention may be realized by means of the devices and methods described in the claims.

To achieve the above objects, the manipulator of this invention comprises an electronic controller and a set of unitized and integrated joint drive modules which can be assembled in series to form an arm. The manipulator is based upon an arm geometry design concept which enables the configuration of manipulators suitable to handle all general-purpose and special-purpose applications from three standardized joint types—roll, pitch, and transverse-assembled in different configurations. Each roll joint of the present invention consists of co-linear internal and external structural shells equipped for relative rotation by a reduction gearing assembly. Each pitch joint is disposed with its axis of rotation substantially perpendicular to and offset from the roll joint axes and consists of two relatively rotating parts, also driven by a reduction gearing assembly of essentially identical form to that employed in the roll joint. In an alternate embodiment, the drive motor and reduction gearing assembly of the roll joint and the pitch joint are combined with the structural members to provide a common integrated joint design. With both embodiments, the present invention provides designs in which roll and pitch joints typically are joined in an alternating series to provide as many degrees of freedom and as much resulting maneuverability as is required by the particular application. The pitch joint axes of rotation are offset from the rotational axes of the roll joints. Each roll joint provides a minimum of 360 degrees of rotation. The offset and rotational range of each pitch joint permits adjacent roll joints to be folded back to be parallel to each other as shown in FIG. 14.

In one embodiment, each pitch joint may be provided with an ear module consisting of a body portion and a clevis arrangement of two parallel ears extending from the body portion. A case module, including a bell portion and a tubular portion extending from the bell portion, is provided such that the tubular portion may be mounted between the parallel ears of the ear module. A drive means also is provided for relative rotation between the case module and ear module and a resolver is provided at the maximum rotational radius to measure the relative rotation. A clutch is also provided to protect the gear reducer and actuator from damage in overload conditions.

With each roll joint of one embodiment there is provided an internal structural shell adapted to be secured readily to the adjacent case module of a pitch joint. There is also provided an external structural shell adapted to be secured to an adjacent ear module of a pitch joint. A drive means is provided to produce relative rotation between the internal and external structural shells of the roll joint and a resolver is provided to measure the relative rotation. An overload clutch is also provided. The above features permit the roll joint and pitch joints to be linked in a series to produce a manipulator with as many self-powered and easily interchangeable joints as are required for the application at hand.

In an alternate embodiment, there is provided a first structural member which houses the stator of a frameless motor. A second structural member is rotatably secured to the first structural member by rotational bearings or equivalent means. Relative rotation between the first structural member and the second structural member is provided through a reduction gearing assembly, preferably an harmonic drive. Where an harmonic drive provides the rotational force, a rotor shaft links the rotor of a frameless motor to the wave generator of the harmonic drive. An overload clutch, an encoder and a brake are also provided. Both the roll joint and the pitch joint of this alternate embodiment consist of the same basic configuration of these elements. They differ principally in that the first structural element and the second structural element are configured so as to orient the roll joint axis in one direction and the pitch joint axis in a perpendicular direction.

A servocontrol is provided for stabilizing the motion of an apparatus such as the manipulator of the present invention. A servocontrol is provided which derives feedback from sensing the motive force on the actuator driven member which is responding to a velocity command signal. The motive force feedback is compared to the command signal and the resulting signal is compensated to provide stability and optimum bandwidth for the servomechanism. There also may be provided velocity and position feedback loops.

The present invention provides numerous advantages and benefits. The independently driven, unitized arm segment designs permit the construction of a manipulator with any number of rotational axes suited to both general-purpose and special-purpose applications from a supply of standardized joint modules and components. This reduces the need for complete redesign when a customer requires a manipulator configured differently than those previously manufactured. Furthermore, the joint geometry permits the creation of manipulator with usual flexibility. The spherical work envelope provided by the manipulator is more complete than most manipulators, including those using the "three-roll wrist" which provides a sphere, less an approximately 90° cone. Additional advantages also result from the unitized nature of the joints. The joints are provided with mounting features which permit a joint to be easily removed and replaced on an existing manipulator. This provides the ability to replace an inoperative joint quickly and easily. This ability may greatly reduce the down time of the manipulator because an inoperative joint can be replaced and the manipulator can be put back in operation while the troublesome joint is taken away for complete disassembly and repair. Furthermore, this feature permits large scale users of the manipulator of the present invention to stock relatively few standardized parts and joints for maintaining a large group of manipulators.

In this exoskeleton structure the principal flexural load bearing member in the roll joint arm segments is a thin-wall tube having a maximum suitable radius from the joint's axis of rotation. This provides an optimum stiffness to weight ratio in the link section. In both roll and pitch joints, the fully internal drives, transducers and wiring are protected from damage and the temperature of these components can be controlled with internal ventilation. Furthermore, the exoskeleton structure reduces the number of moving surfaces which must be sealed to one per roll joint and two per pitch joint. In an alternate embodiment, this is further reduced to one seal per joint both for the roll joint and the pitch joint. This helps to protect the internal drives, transducers and wiring from contamination, corrosive vapors and liquids. Indeed, with the selection of proper seals and with internal pressurization, the present invention can be made to be submersible in liquids. Conversely, in applications such as semiconductor manufacturing where the operating environment must be kept clean, the readily sealed exoskeleton structure may be used to keep machine-generated contaminants inside the machine.

In one embodiment, the symmetrical bearing arrangement of the pitch joint modules provides maximum static and dynamic performance through balanced bearing and structure loading.

By mounting the resolvers or encoders at the maximum radius within each pitch joint and roll joint module, the highest possible ratio between joint and resolver armature can be achieved. Joint rotation is measured directly, in a thermally stable mounting, providing for high measurement accuracy and repeatability.

The relationship of dimensions of successive joints comprising the manipulator, including the offset of the pitch joint axes from the roll joint axes provides a manipulator of unusual maneuverability, dexterity and repeatability. The capability of the controller to control this manipulator in a sensory interactive manner, and indeed, to support kinematically redundant form, permits manipulator configurations, which can easily reach around objects and avoid obstacles as shown in FIG. 12. In addition, the offset of the pitch joint from the central axis of the machine, while presenting mathematical difficulties for the controller, enables the manipulator to fold back upon itself, thus making an arm of a given length and working envelope highly compact and contracted, thus increasing the effective working envelope.

Unlike typical machine tool designs, the servocontroller of a highly maneuverable manipulator such as that of the present invention requires special considerations to avoid sluggish and imprecise manipulator motion. The servocontrol of the present invention improves the smoothness and precision of motion of the by using feedback and compensation techniques to eliminate mechanical roughness in the manipulator system.

Additional advantages of the invention will be described in the description below and may become apparent to those skilled in the art upon reading the description or upon practicing the invention.

BRIEF DESCRIPTION OF THE DRAWINGS

FIG. 5 is a top view of a portion of the manipulator arm extended with the rotational axes of the adjacent roll joints colinear.

FIG. 6 is a side elevational view of the manipulator arm segment of FIG. 5.

DETAILED DESCRIPTION

Figure 1:
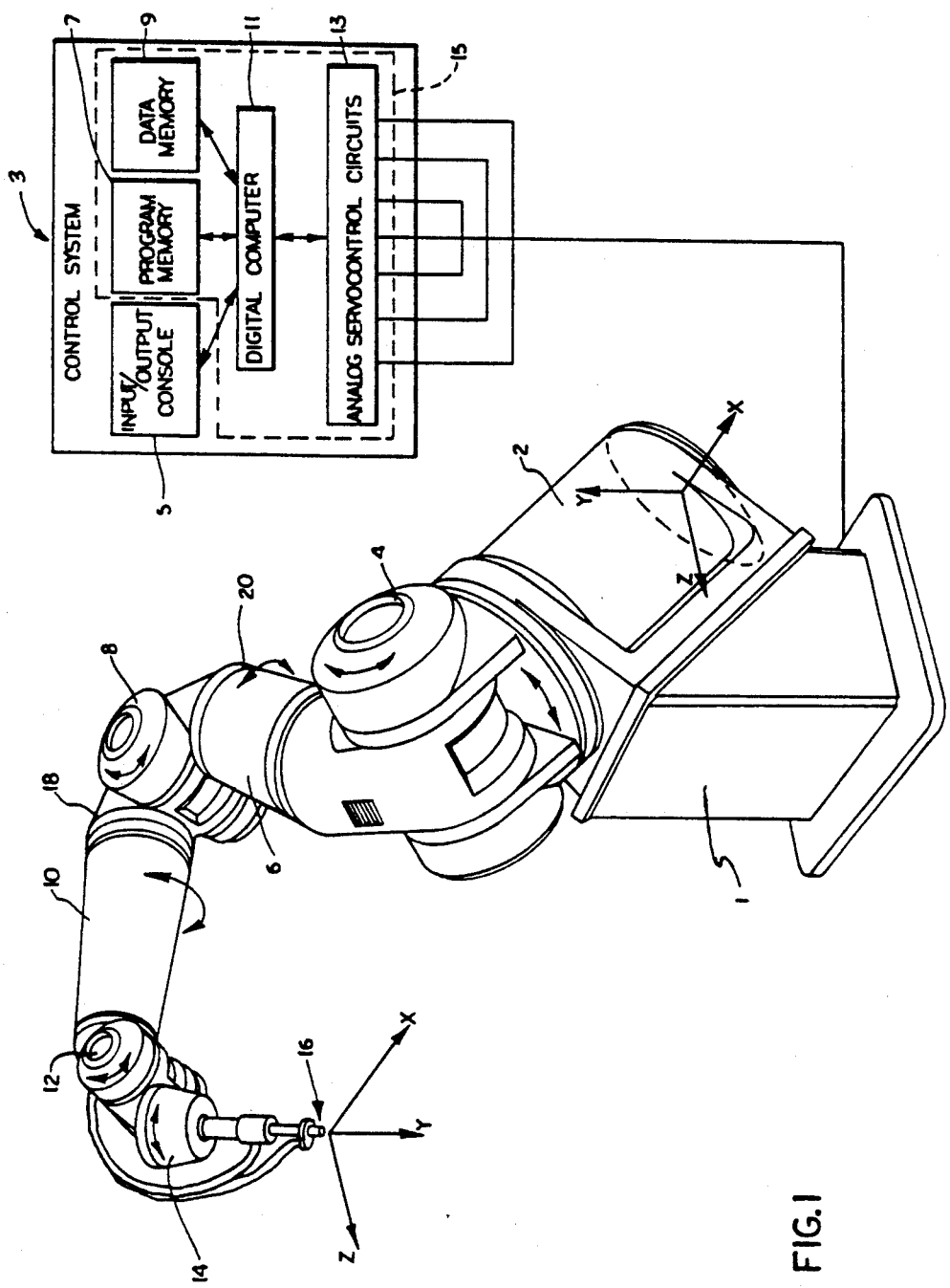
FIG. 1 is a perspective view of the manipulator according to the present invention with a diagrammatic illustration of the control system.

The present invention comprises an articulated anthropomorphic manipulator arm controlled electronically. A perspective view of the typical configuration of the present manipulator arm is shown in FIG. 1. The assembled structure consists of a linked series of arm segments or "joints" which extend from the base 1. The base 1 may be attached to a floor, overhead support structure, mobile track or other suitable support means.

The arm joints comprising the manipulator are of two basic types, roll joints, 2, 6, 10, and 14 are pitch joints, 4, 8, and 12. Except for variations in dimensions, a description of one pitch joint is representative of all pitch joints and a description of one roll joint is representative of all roll joints. That is, a manipulator arm could be built with any number of arm joints constructed according to the joint descriptions contained herein. It may be advantageous in some cases, however, to modify the design of the end joints 2 and 14 to accommodate specific applications or size limitations of components.

The pitch joints and the roll joints are independently powered to provide relative rotation about their longitudinal axes as shown by the arrows in FIG. 1. In a typical assembly such as that shown in FIG. 1, the first arm joint adjacent the base if roll joint 2. Each roll joint provides rotation about its longitudinal axis. The typical arm configuration includes a series of alternating pitch joints and roll joints terminating in an end effector or tool 16 at the distal end of the arm. As seen in FIG. 1, in one embodiment the roll joints typically decrease in cross-sectional area in the direction of the distal end of the arm. Similarly, in both embodiments the successive pitch joints following in that direction each typically reduce in size. On each typical pitch joint, such as pitch 8, the distal mounting collar 18 is smaller in diameter than the proximal mounting collar 20. While the arm joints of the manipulator reduce in size from the proximal to the distal end of the manipulator in the preferred embodiment, this feature is not a requirement of the present invention. By rotation of the various arm joints, the location and orientation of the tool 16 can be adjusted anywhere within the working envelope of the arm.

As illustrated in FIG. 1, and described below in greater detail, the arm joints are exoskeleton in nature. That is, the arm joints are comprised principally of tubular structures which provide the structural support necessary to carry a load at the tool location. Each arm joint is independently driven with its own internal motor and reduction gearing assembly contained within the exoskeleton structure. The exoskeleton structure provides the advantage of a high stiffness to weight ratio for the arm. The exoskeleton structure also protects the drive mechanisms as well as the wiring which, in the preferred embodiment, passes internally through the structure from joint to joint. In addition, the exoskeleton structure permits each of the drive motors to be air cooled, if necessary, by a single air source located in the base 1 of the arm. The exoskelton design also may be sealed to permit underwater applications of the present invention or it may be positively ventilated to permit use in heavily contaminated environments.

Figure 2:
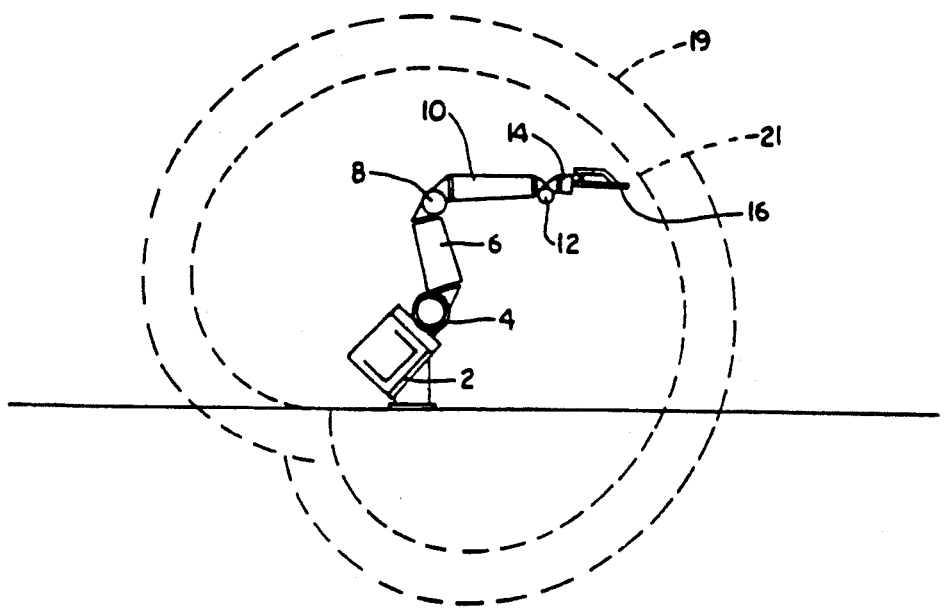
FIG. 2 is a side elevational view of the manipulator configured to include seven axes, illustrating the work envelope of the manipulator.

FIG. 2 illustrates the working envelop of a manipulator arm according to the present invention. As seen from this illustration and others, each of the pitch joints, 4, 8, and 12 is offset from the longitudinal axis of the arm extended with roll joint axes colinear. This offset permits the manipulator arm to be folded back on itself or to be fully extended. This design feature provides a substantially spherical work envelope similar to that provided by human arm.

Figure 3:
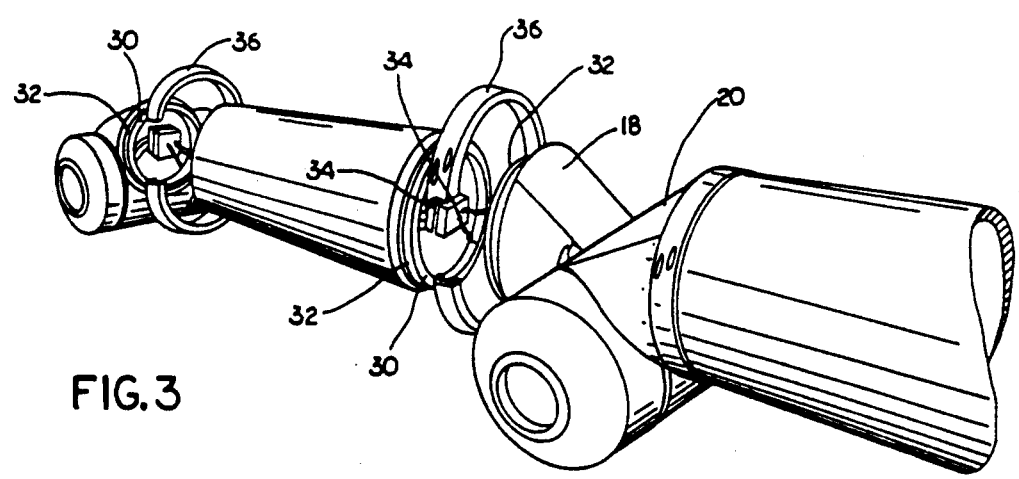
FIG. 3 is an exploded perspective view illustrating the means for assembling consecutive arm joints of the manipulator.

FIG. 3 illustrates the manner in which successive arm joints are connected according to the present invention to build a manipulator. As explained below in greater detail, each roll joint and each pitch joint includes at both ends a mating face 30 and ramped ridge 32. In addition, the wiring necessary to accommodate the successive arm joints is carried internally and is connected to mating coupling assemblies 34 provided at each end of the arm joints. These features permit the arm to be easily constructed of successive arm joints, reducing in size toward the distal arm end.

To attach adjoining arm joints, the joints are brought into close proximity and the wire couplings 34 are engaged. Next, the abutting faces 30 are placed in abutment. Finally, a clamp ring 36 is applied over the ramped ridges 32 of the adjoining arm joints and the ring 36 is tightened. In this manner, the successive arm joints are structurally linked and the wiring necessary to drive the more distal arm joints is connected. This clamping arrangement, described in greater detail below, provides the benefit of a uniform, continuous clamping force around the periphery of abutting segment faces 30 with a few as one bolt or other fastener. Consequently, successive arm segments can be quickly removed for repair and replaced with a substitute arm segment from inventory. Those skilled in the art will recognize that other fastening means between successive joints are possible. For example, each abutting end could be provided with an outwardly extending radial flange with a series of holes suitable to accommodate bolts or other appropriate fastening means though such a flange may limit the ability to fold the manipulator back upon itself.

Figure 4:
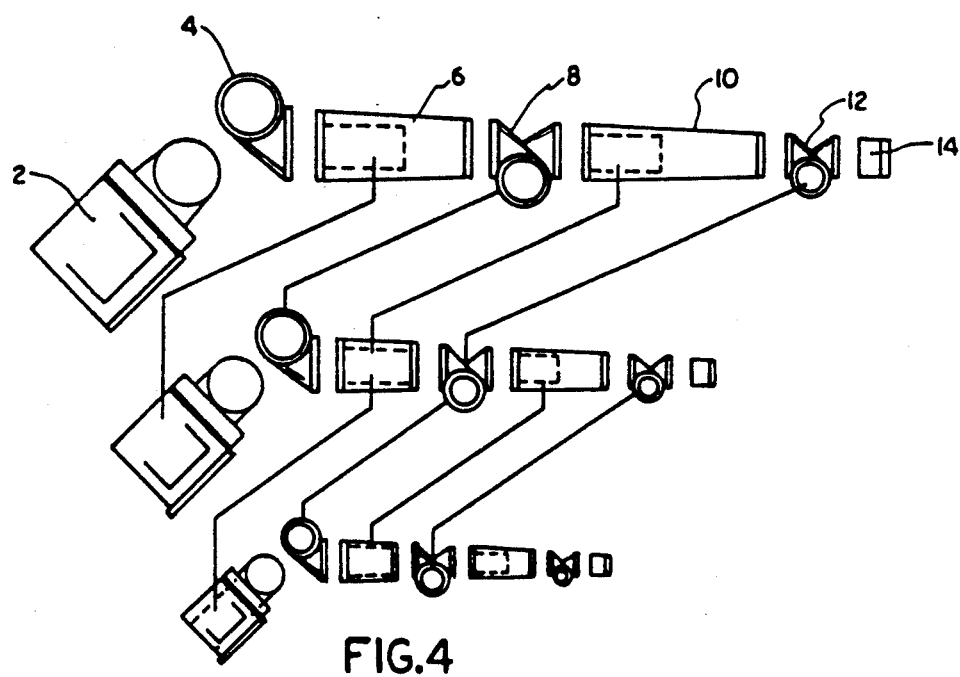
FIG. 4 is a semi-diagrammatic representation of the modularity feature provided by the present invention.

The exoskeleton structure and independent drive means of each joint provides numerous benefits. As previously mentioned, an inoperative are segment can quickly be removed for repair and replaced with an identical off-the-shelf arm segment. These features, together with the general reduction of size from proximal to distal arm ends, also permit the interchangeability of arm joints and internal drive assemblies across various size and strength classifications of manipulators as illustrated in FIG. 4. Thus, a series of independently driven unitized pitch and roll joints can be produced which can be combined in various ways to provide a broad size and strength range of manipulators. More importantly, the number of successive arm joints combined to comprise a particular manipulator design can be varied widely. For example, for certain simple tasks it may be sufficient to have only three arm joints with a tool attached at the end of the third arm joint. Where greater maneuverability is required, the manipulator arm of the present invention can include any number of successive arm joints. As explained below, the preferred embodiment of the present invention consists of seven or more arm joints. By using seven or more arm joints, a manipulator can be constructed which will be able to reach around obstacles in various ways to apply a tool in a particular location and orientation. Furthermore, the use of seven or more arm joints creates a condition known as "redundancy" which provides numerous operational advantages if properly controlled.

Turning to FIG. 5, there is illustrated a top view of a portion of the manipulator arm extended with the roll joint axes colinear. In this embodiment, the roll joints 6 and 10 have reducing cross-sectional areas in the direction of the distal end of the manipulator. The pitch joints 8 and 12 are positioned between each roll joint to provide rotation around their central axes 40 and 42, respectively.

The top view of pitch joint 8 in FIG. 5 provides some indication of the manner in which pitch joints are constructed and the manner in which they operate. As previously stated, the joint includes a distal mounting collar 18 and a proximal mounting collar 20 which are of diameters suitable to accommodate the adjoining roll joints 10 and 6, respectively. In this embodiment each pitch joint consists generally of two halves, an ear module 44 and a case module 46, which are joined by bearings and a drive means. The ear module 44 and the case module 46 pivot in relation to each other about the axis 40. A drive means for the pitch joint is contained within the pitch joint. The drive means extends longitudinally beyond the ears 48 and 50 of the ear module 44 and is enclosed by the motor cover 52 and the drive cover 54.

FIG. 6 is a side view of the structure of FIG. 5 and clearly illustrates that the rotational axis 40 of the pitch joint 8 is offset from the rotational axes 50 and 52 of the roll joints.

Figure 7:
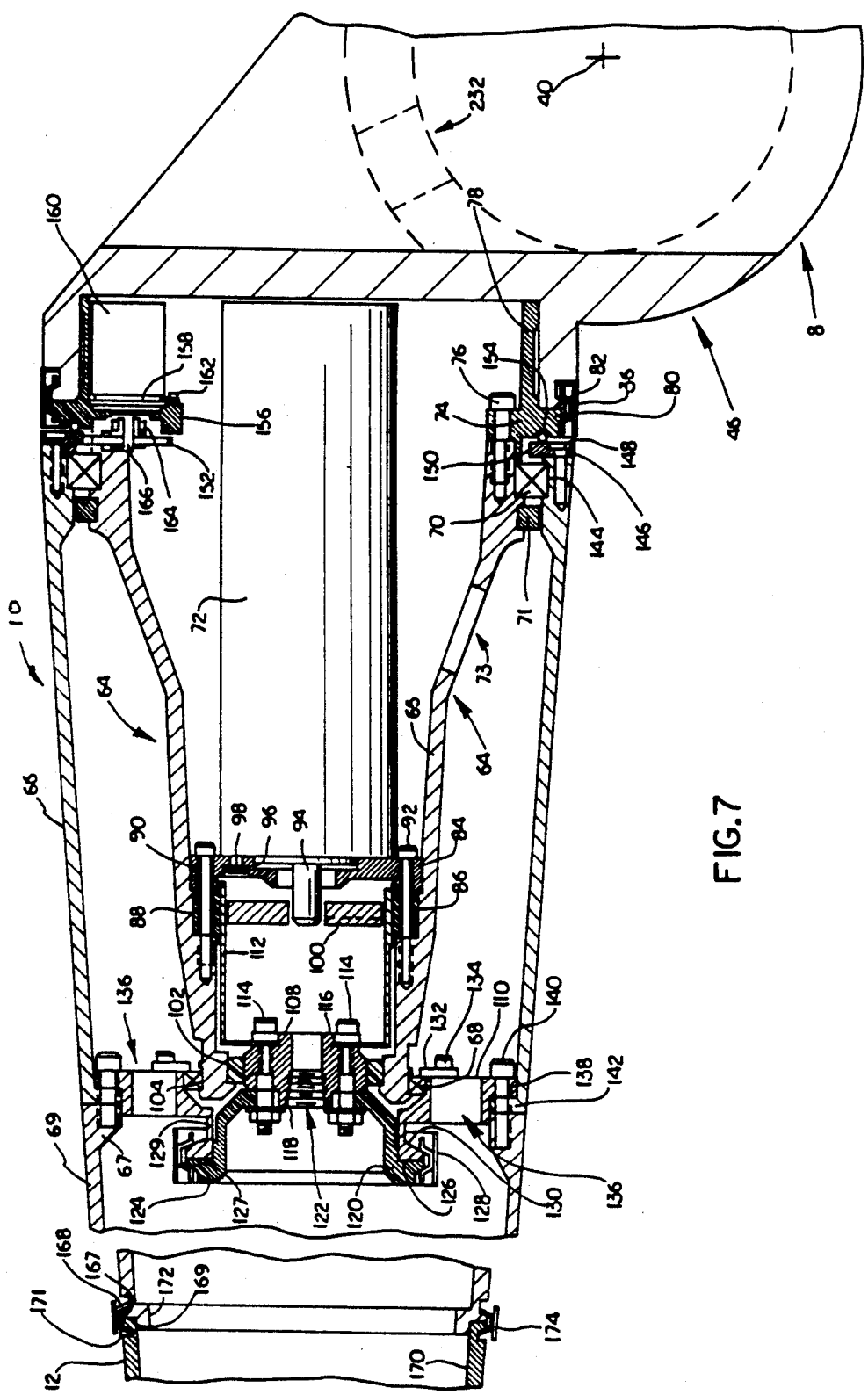
FIG. 7 is a fragmented cross-sectional view of a roll joint taken along section line 6—6 of FIG. 5.

Turning now to FIG. 7, there is illustrated a partial cross-sectional view of the structure of FIG. 5 taken along section line 7—7. The pitch joint 8 is diagrammatically illustrated, including its axis 40. The roll joint 10 is made up of two basic parts, an inner drive housing assembly 64 and an outer skin 66. The inner drive housing and associated assembly 64 is rigidly secured to the case module 46 of the pitch joint 8 by clamp ring 36. The outer skin 66 is mounted to the inner drive housing assembly 64 on bearings 68 and 70. When the motor 72 of inner drive housing assembly 64 is energized, the outer skin 66 rotates relative to inner drive housing assembly 64 and case module 46.

Turning to the drive housing assembly 64, there is provided an inner drive housing 65 with an outer bearing diagrammatically indicated at 70 mounted on an exterior bearing surface of drive housing 65. An annular seal 71 also is provided between drive housing 65 and outer skin 66 and a passage 73 is provided for passing wires. The inner race of the bearing 70 is clamped to the drive housing 65 by inner bearing clamp 74. The inner bearing clamp 74 is detachably fastened to the drive housing 65 by a series of bolts 76, or other suitable fastening means. The inner bearing clamp 74 includes an annular skirt 78 adapted to snugly fit within the annular recess provided in case module 46 of pitch joint 8. The inner bearing clamp on its outer periphery includes a sloped ridge 80. Likewise, case module 46 includes a sloped ridge 82 on its outer periphery adjacent the abutting surfaces between the case module 46 and the inner bearing clamp 74. The sloped ridges are adapted to accommodate a clamp ring 36. When the clamp ring 36 is applied and tightened, the inner bearing clamp 74 and the drive housing 65 become rigidly fixed to the case module 46.

Toward the distal end of the drive housing 65 there is provided, on its interior, two stepped annular surfaces 84 and 86 to accommodate the rigid spline 88 and the motor mount plate 90. The rigid spline 88 and motor mount plate 90 are rigidly affixed to the drive housing 65 by a series of bolts 92. The motor mount plate 90 includes a central aperture suitable to accommodate motor drive shaft 94. The motor mount plate 90 also is provided with a stepped recess 96 adapted to accommodate the collar of the motor 72. Motor mount plate 90 also includes an aperture through which suitable fasteners 98 can be applied to rigidly mount motor 72 to the motor mount plate 90. To the end of motor shaft 94 there is attached a wave generator 100 which is an integral part of the harmonic drive assembly. Wave generator 100 and the harmonic drive assembly are explained in greater detail below.

Near the distal end of drive housing 65 there is provided on the interior surface an annular interior seal 102. Likewise, there is provided on the exterior surface an annular bearing seat 104. The interior seal 102 maintains lubrication within the harmonic drive. The distal exterior bearing 68 maintains spacing and allows relative rotation between drive housing 65 and clutch ring 110.

Mounted within the drive housing near the distal end is a harmonic drive assembly. The harmonic drive assembly is a conventional commercially available item. The harmonic drive assembly includes flexspline 112 which is situated such that its exterior gear teeth are axially aligned with the teeth of rigid spline 88. The closed end of flexspline 112 is rigidly mounted via bolts 114 to harmonic drive collar 108. The harmonic drive collar 108 is provided with centering stubs 116 and 118. Centering stub 116 establishes the alignment of flexspline 112 so that flexspline 112 can be secured to harmonic drive collar 108 by bolts 114. Centering stub 118 performs a similar function on the distal side of the harmonic drive collar 108. Around centering stub 118 of harmonic drive collar 108 there is mounted a clutch plate 120 which is rigidly retained to the harmonic drive collar 108 by bolts 114. Harmonic drive collar 108 also includes a threaded central aperture 122 for receiving a sealing plug to retain lubricants and provide access to adjust the wave generator 100.

Clutch plate 120 extends in the distal direction and flares outwardly radially to provide an annular sloped ridge 124 and a radial abutment surface 126. Clutch ring 110 also provides a distal region with a corresponding annular sloped ridge 130 and a cooperation radial abutment surface. When the abutment surfaces 126 and 127 of clutch plate 120 and clutch ring 110 are brought into abutment and a ring clamp 128 is attached to clutch plate 120 and clutch ring 110 engaging sloped ridges 124 and 130, this assembly provides a clutch for transmitting the rotary motion for the motor 72 and harmonic drive assembly to the outer skin 66. This is explained in greater detail below. Clutch ring 110 has mounted on surface 129 several strain gauges which are used for feedback control of the arm motion.

Towards it proximal end, clutch ring 110 provides an annular bearing seat for the outer race of the distal exterior bearing 68. This race is retained on the clutch ring 110 bearing seat by an annular bearing clamp 132 and a plurality of bolts 134 or other suitable fasteners. Clutch ring 110 also includes arcuate apertures, two of which are shown at 136. These apertures provide a space for the internal wiring to pass from joint to joint. The outer circumference of clutch ring 110 includes an annular bolt rim 138. The bolt rim 138 contains a number of apertures suitable to accommodate a series of bolts 140. The bolts 140 pass through clutch ring 110 to threadedly engage internal annular lip 142 of the distal end of outer skin 66 and engages flange 67 of the proximal end of distal outer skin 69.

The outer shell of the roll joint may consist of a single outer skin 66 or may include a distal outer skin 69. In the preferred embodiment, the transverse cross-section of the outer skin 66 and distal outer skin 69 increase in the direction of the proximal end of roll joint 6. At the proximal end on the interior diameter there is provided a bearing seat 144. The outer race of bearing 70 is retained on the bearing seat 144 by an annular outer bearing clamp gear 146 which is rigidly attached to the outer skin 66 by a series of bolts 148. Outer bearing clamp gear 146 is provided with internal gear teeth 150. The internal gear teeth 150 are adapted to mesh with anti-backlash gear 152 which protrudes through arcuate apertures (not shown) in the inner bearing clamp 74 and drive housing 65. As an additional function, outer bearing clamp gear 146 provides a wear subface for a tube seal 154. Tube seal 154 is held in place by a recess provided in the distal face of inner bearing clamp 74.

Inner bearing clamp 74, in addition to the features described above, is provided with a resolver mounting surface 156. The resolver mounting surface 156 contains an aperture adapted to accommodate a mounting flange and pilot 158 of a standard, commercially available resolver 160. The resolver 160 is retained within the mounter aperture by clamp 162. The anti-backlash gear 152 is mounted to the resolver shaft by clamp 164. With this mounting, the resolver is able to provide a measure of relative rotational position between the drive housing 65 and the outer skins 66 and 69.

In the preferred embodiment, motor 72 includes both a brake and, optionally, a tachometer. In operation, an electrical current is supplied to motor 72 causing the wave generator 100 of the harmonic drive assembly to rotate within the flexspline 112. This action induces a counter-rotating motion in the flexspline 112 which is transmitted to the rigidly attached harmonic drive collar 108. The rotating motion is transmitted through the collar 108 to clutch plate 120. The clutch assembly guards against overloading of the harmonic drive assembly. The clamping force of ring clamp 128 is set to allow slippage between clutch plate 120 and clutch ring 110 in the event the torque load on the roll joint exceeds the torque capabilities of the harmonic drive assembly. If the torque load does not exceed this limit, the clutch assembly transmits the rotational movement of the harmonic drive assembly to the clutch ring 110 and ultimately to outer skin 66. As previously described, this relative rotation between the drive housing assembly 64 and the outer skin 66 assembly is accommodated by outer bearing 70 and distal exterior bearing 68. As the outer skin 66 rotates relative to the drive housing assembly 64, the outer bearing gear clamp 146 moves in relation to the resolver 160 location. The gear mesh between outer bearing gear clamp 146 and anti-backlash gear 152 causes rotation of the resolver shaft 166. In this manner, the resolver 160 can be used to measure rotation of the roll joint 10 and relative rotational position of the outer skin 66 with respect to the drive housing 65.

At the distal end of distal outer skin 69, there is provided an annular abutting face 167, sloped ridge 168, and interior annular lip 172. Ear module 170 of pitch joint 12, as shown in FIG. 5, includes an identical annular abutting face 169 and a corresponding sloped ridge 171. The inner diameter of the ear module 170 is adapted to closely fit on the lip 172. When the ear module 170 and outer skin 66 are mated and the distal ring clamp 174 is applied, the ear module 170, ring clamp 174, and distal outer skin 69 are rigidly joined.

Figure 8:
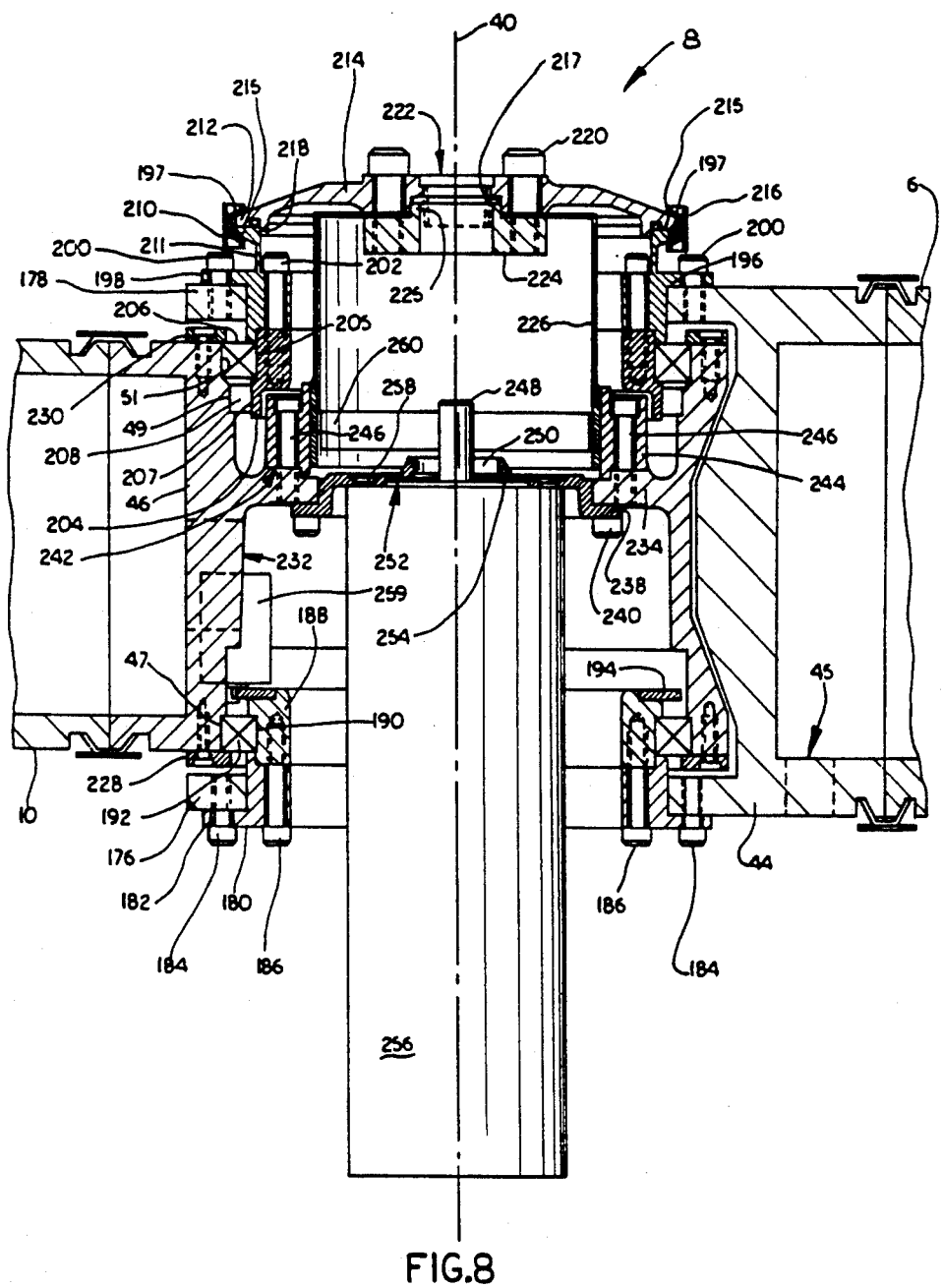
FIG. 8 is a fragmentary elevational view, partly in cross-section, of a pitch joint taken along section line 8—8 of FIG. 6.

Turning now to FIG. 8, there is illustrated a partial cross-sectional view of one embodiment of the pitch joint 8. As with a roll joint 10, the pitch joint 8 includes two major structural parts which rotate relative to each other. These relatively rotating parts are the ear module 44 and case module 46, also visible in FIG. 4. As shown in FIGS. 3, 5, and 6, the ear module 44 of each pitch joint is disposed in the manipulator arm assembly nearest the proximal end of the manipulator arm while the case module 46 is disposed nearest the distal end of the manipulator arm. Thus, for simplicity it is sensible to view the pitch joint as operating with a fixed ear module 44 and a rotating case module 46.

As the name would suggest, the ear module 44 includes two parallel ears, motor ear 176 and drive ear 178 extending outwardly toward the distal side of the pitch joint. The ears 176 and 178 are disposed in parallel planes which are parallel to the rotational axes of the adjoining roll joints 6 and 10. (See also FIGS. 5 and 6.) Each ear 176 and 178 includes an aperture suitable for accommodating a bearing inner race support assembly.

Turning first to the motor side of the pitch joint (the lower portion of FIG. 8), the motor ear 176 bearing support assembly is shown in detail. The motor ear 176 is provided with an aperture suitable to accommodate a snugly fit inner bearing clamp 180. The motor side inner bearing clamp 180 contains a radially extending flange 182 which abuts the outer surface of the motor ear 176. Spaced apertures are provided in the flange 182 to allow passage of bolts 184 which are threaded into mating threaded holes around the perimeter of the motor ear 176 aperture. The motor side inner bearing clamp 180 also includes a ring of apertures for accommodating bearing bolts 186. These bolts draw together the motor side inner bearing clamp 180 and the motor side inner bearing collar 188. Inner bearing collar 188 is provided with an annular bearing seat 190. The inner race of motor side bearing 192 is seated upon the bearing seat 190 and clamped in place by the bolt force holding together the motor side inner bearing collar 188 and the motor side inner bearing clamp 180. The inside face of the motor side inner bearing collar 188 includes a stepped surface suitable to accommodate an external tooth gear 194. The external tooth gear 194 is retained on the motor side inner bearing collar 188 by bolts or other suitable fastening means (not shown).

Turning to the drive side, a similar bearing mounting arrangement is illustrated. The drive side ear 178 includes an aperture suitable to accommodate the intermediate surface of inner bearing clamp/clutch 196. Inner bearing clamp/clutch 196 includes a flange 198 with spaced apertures suitable to accommodate a number of bolts 200 which engage threaded holes around the periphery of the central aperture in drive ear 178. The inner bearing clamp/clutch 196 is also provided with an internal array of apertures suitable to accommodate bolts 202 which engage threaded holes in the mating drive side inner bearing collar 204. The drive side inner bearing collar 204 includes on its outer surface a bearing seat 205. The inner race of bearing 206 is mounted on the bearing seat 205 and retained between the drive side inner bearing collar 204 and the inner bearing clamp/clutch 196 by the clamping force of bolts 202. In addition, the drive side inner bearing collar 204 includes a mating surface 207 on its outer diameter near the inner end of the collar. This surface is suited to accommodate an annular seal 208. The end of the inner bearing clamp/clutch 196 includes a flat abutment face 197 and a sloped ridge 210. The flat annular abutment face 197 is adapted to mate with an identical abutment face 215 and a sloped ridge 212 on the harmonic drive clutch plate 214. A ring clamp 216 is secured over the ramped ridges 210 and 212 to provide a clutch mechanism similar to that found in the roll joint of FIG. 7. Surface 211 of inner bearing clamp/clutch 196 includes several strain gauges which are used for feedback control of the arm motion.

In addition to the sloped ridge 212, the harmonic drive clutch pate 214 includes a centering stub 218 the outer diameter of which roughly mates with the adjacent inner diameter of the inner bearing clamp/clutch 196. The harmonic drive clutch plate 214 includes a circular array of apertures which accommodate bolts 220. Clutch plate 214 also includes a central aperture 222 suitable for a plug to retain lubricant and permit access to the wave generator 260 for adjustment. Bolts 220 extend through clutch plate 214 to engage threaded holes in harmonic drive collar 224. The harmonic drive collar 224 includes a center stub which mates a central recess 217 in the harmonic drive clutch plate 214. These control surfaces ensure centering of the various parts. The harmonic drive clutch plate 214 and harmonic drive collar 224 mate and retain between their surfaces the flexspline 226 of the harmonic drive assembly.

Turning now to the case module 46, there is provided a generally tubular body slightly shorter than the distance between the ears 176 and 178 of the ear module 44. At each end of the tubular case module 46, on the inner diameter, there is provided annular bearing seats 47 and 51 for the outer races of bearings 192 and 206, respectively. On the drive side of the case module 46 inner diameter, there is further provided an annular seal contact surface 49 for seal 208. The outer races of the motor side bearing 192 and the drive side bearing 206 each are retained on their respective bearing seats by the motor side outer bearing clamp 228 and the drive side outer bearing clamp 230, respectively. The case module also includes a slotted region 232 opposite the ear module 44 which accommodates the passage of electrical wires.

The case model 46 includes an integral radial flange 234 which extends inward to provide mounting surfaces. At the center of this flange there is provided an aperture which is concentric with the axis of rotation 40 of the pitch joint 8. The aperture is adapted to accommodate a motor mount plate 238. The motor mount plate 238 includes an annular array of apertures suitable to accommodate bolts 240 which engage threaded holes in the case module interior flange 234. The case module interior flange 234 also provides on its drive side a surface 242. The rigid spline 244 of the harmonic drive assembly is rigidly mounted to the surface 242 by bolts 246 which extend through the gear to engage threaded holes in the case module interior flange 234.

The motor mount plate 238 includes a central aperture suitable to accommodate passage of the motor drive shaft 248 and a suitable seal 250. The motor mount plate 238 includes a circular recess 252 on its motor side which is provided to accommodate the centering collar 254 of the motor 256. The motor mount plate 238 also provides recessed apertures through which appropriate screws or bolts 258 can be passed to rigidly mount the drive motor 256 to the motor mount plate 238. Mounted on the motor shaft 248 is a wave generator 260, a part of the harmonic drive assembly.

In operation, an electric current is supplied to motor 256 causing rotation of the motor drive shaft 248 and of the wave generator 260 of the harmonic drive assembly. The creates relative movement between the rigid spline 244 and the flexspline 226 of the harmonic drive. Viewing the ear module 44 as fixed, the result is that the rigid spline 244 rotates around the flexspline 226 inducing rotation of the case module 46 relative to the ear module 44. Bearings 192 and 206 are interposed between the ear module 44 and the case module 46 to accommodate the rotation. If the torque load encountered by the pitch joint exceeds the frictional resistance provided by the clutch assembly, the case module 46 and ear module 44 will remain fixed in their relative location and the harmonic drive clutch plate 214 will rotate relative to the inner bearing clamp/clutch 196. Thus, when the clutch is properly set it will prevent damage to the harmonic drive assembly.

When relative rotation occurs between the ear module 44 and the case module 46, rotation of the shaft of resolver 259 results. This occurs because the resolver 259 is mounted in the case module 46 while the teeth of the anti-backlash gear mounted on the resolver shaft (not shown) engage the external tooth spur gear 194 which is rigidly mounted to the ear module 44. This arrangement provides a means for detecting the relative rotation and the relative rotational position between the case module 46 and ear module 44.

Figure 15:
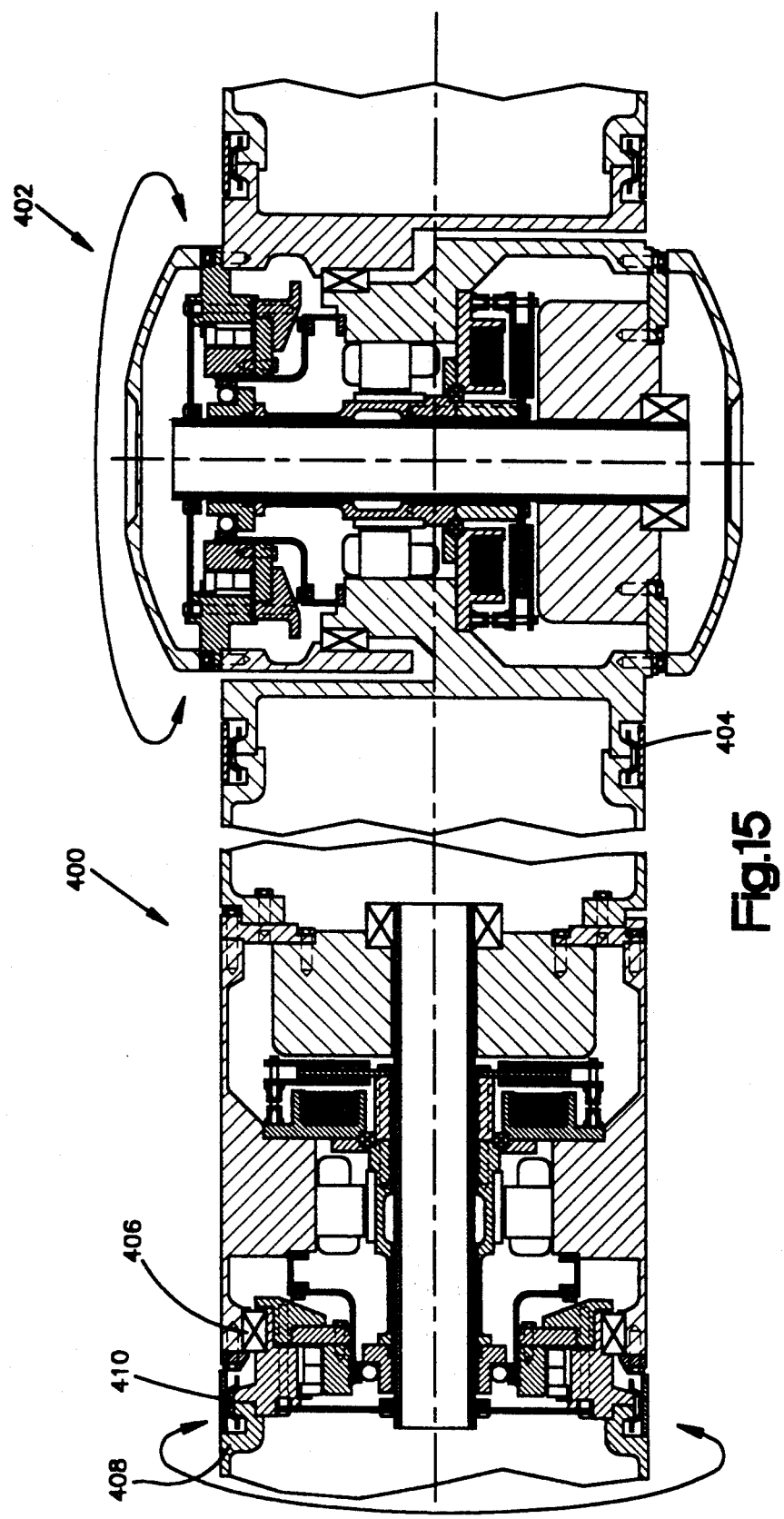
FIG. 15 is a cross-sectional view of an alternate embodiment of a roll joint and pitch joint configuration.

Referring to FIG. 15 there is illustrated an alternate embodiment in cross-sectional view of a roll joint 400 and a pitch joint 402 of the present invention. The roll joint 400 is made up of two basic parts, a first structural assembly and a second structural assembly. As shown in FIG. 15, one of these structural assemblies is rigidly secured to the pitch joint 402 by clamp ring 404. The other structural assembly is connected by bearing 406 and is rigidly secured to the next adjacent joint 408 by clamp ring 410. Power and communication wires are strung from joint to joint through the wire passage tubes, shown in the center of each joint and described in greater detail below, and through holes in the structural assemblies in a manner similar to that described above with another embodiment. When the roll joint is energized, the structural assemblies rotate relative to each other. The same general configuration applies to the pitch joint 402 except that its axis of rotation is askew from that of the roll joint.

Figure 16:
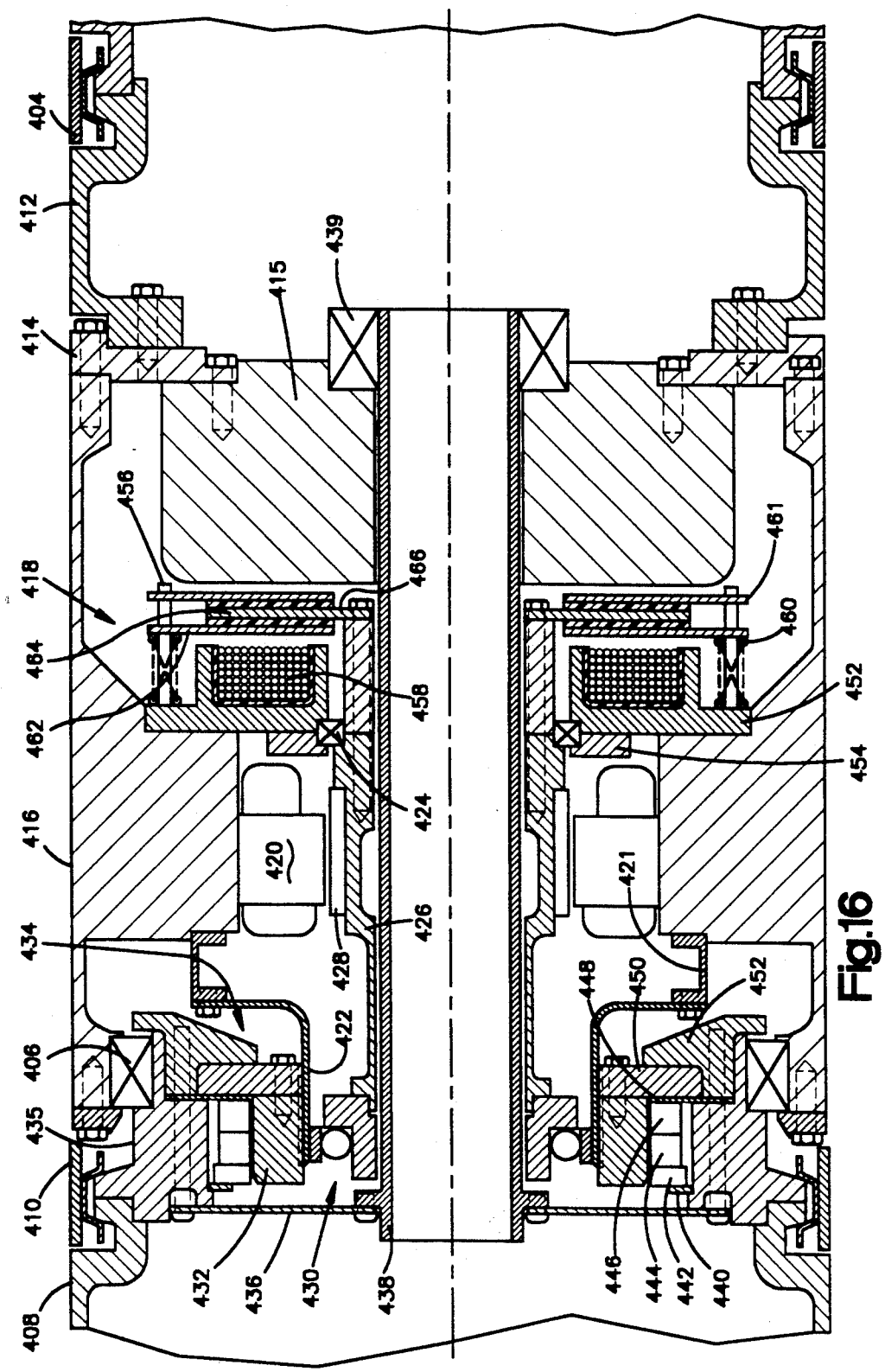
FIG. 16 is a cross-sectional view of the roll joint of FIG. 15.

Turning to FIG. 16 moving from right to left through the first structural assembly, there is provided a connecting sleeve 412, and end plate 414, a first outer tube 416, a frameless motor stator 420, a torque bridge 421 and a harmonic drive flexspline 422, all rigidly connected as an assembly. Also attached to the first structural assembly in the preferred embodiment are an encoder or similar measuring device 415 and a brake assembly shown generally at 418. The first structural assembly is rotatably connected to the second structural assembly via the bearings represented diagrammatically at 406.

A rotor shaft assembly can be seen in the interior of FIG. 16 mounted within the first structural assembly by bearing 424 and wave generator 430. The rotor shaft assembly consists of a bearing mounted shaft 426, a frameless motor rotor 428, and an harmonic drive wave generator 430, all rigidly connected as an assembly.

The second structural assembly consists of a harmonic drive rigid spline 432, a slip clutch assembly shown generally at 434, and a second outer tube 435. Also attached to the second structural assembly in the preferred embodiment are a wire tube disk 436 and a wire passage tube 438.

The roll joint of FIG. 16 operates in the following manner. When the frameless motor stator 420 is energized, the rotor shaft assembly, which consists of items 426, 428 and 430, as well as portions of the brake assembly explained below, rotate within the confines of bearing 424 and wave generator 430. Because the harmonic drive flexspline 422 is rigidly affixed to the first outer tube 416 via the torque bridge 421, the rotation of the wave generator 430 forces rotation of the rigid spline 432 relative to the first structural assembly. The rotational motion of the rigid spline 432 is transmitted via a slip clutch to the second structural assembly through the slip clutch assembly 434, thus causing rotation of the slip clutch assembly 434, the second outer tube 435, the wire tube disk 436, the wire passage tube 438, the ring clamp 410 and the next adjacent joint 408.

Torque bridge 421 has mounted on its surface several strain gauges for detecting joint torque. Also, encoder 415 detects the relative rotation of the first structural assembly to the second structural assembly by monitoring the rotation of wire passage tube 438 which is communicated through the coupling represented diagrammatically at 439. The measurement of rotation is taken here so that it is independent of the dynamics of the gear train. These measurements are used for feedback control of the arm motion.

Focusing now on the slip clutch assembly 434, in one embodiment it consists of a retaining ring 440, a washer 442, a wave spring represented diagrammatically at 444, a wave spring spacer 446, a clutch plate spacer 448 and a clutch plate 450. The wave spring 444 applies a preset pressure against the wave spring spacer 446 and clutch plate spacer 448, thereby causing the clutch plate 450 to be pressed between the clutch plate spacer 448 and the inner clutch plate 452. The wave spring 444, washer 442 and wave spring spacer 446 are held in place by the retaining ring 440. The slip clutch assembly 434 permits relative slippage between the clutch plate 450 and the second structural assembly in the event of an overload condition.

Focusing now on the brake assembly 418, in one embodiment there is provided a bearing and solenoid support plate 452 and bearing retainer 454 rigidly connected to the first outer tube 416. Several brake disk support members 456 are provided around the periphery and affixed to the bearing and solenoid support plate 452. A solenoid 458 is housed in the brake and solenoid support plate 452. Each of the brake disk supports 456 located around the periphery of the bearing and solenoid support plate 452 carries a spring 460. There is provided a brake disk 461 rigidly secured to the brake disk support members 456. There is also provided a clapper 462 adjacent the solenoid 458 in the shape of an annulus in which there are several apertures provided around its periphery to accommodate the brake disk support members 456. When the solenoid 458 is activated, the clapper 462 is held in contact with the solenoid and the springs 460 are in comprehension. When the solenoid is deactivated, the springs 460 force the clapper 462 against brake flywheel 464 which has treated contact surfaces. Brake flywheel 464 is connected to the rotor shaft assembly by brake shaft 466. Thus, the brake shaft 466 and brake flywheel 464 freely rotate at high speed with the rotor shaft assembly when the brake solenoid 458 is energized and the motor stator 420 is energized. When the energy to the solenoid 458 is deactivated, the brake springs 460 cause the clapper 462 to exert a clamping force on the brake flywheel 464, thus halting the rotation of the rotor shaft assembly and, consequently, the relative motion of the first structural assembly to the second structural assembly of the roll joint.

Figure 17:
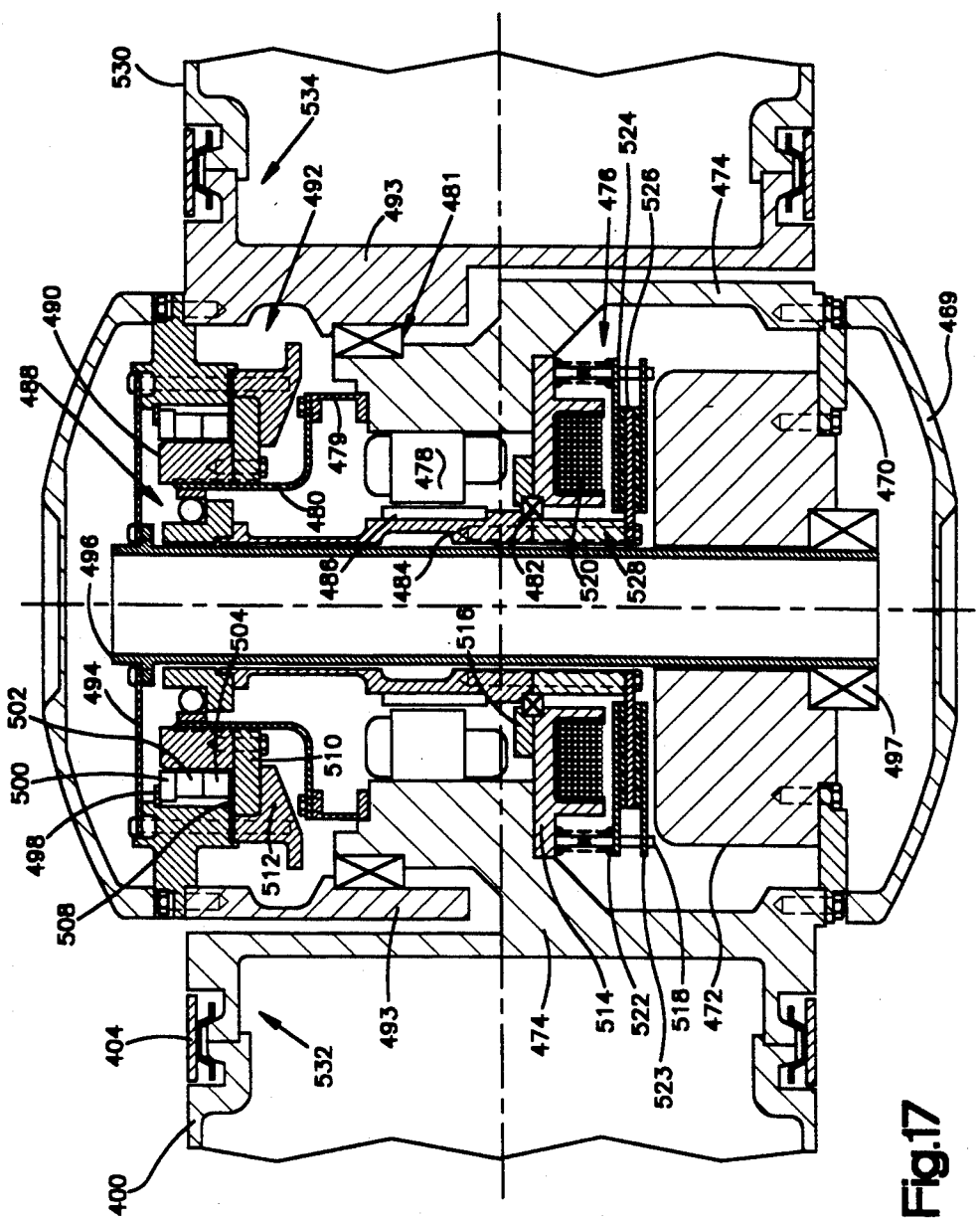
FIG. 17 is a cross-sectional view of the pitch joint of FIG. 15.

Turning to FIG. 17, there is shown a pitch joint of design similar to the roll joint of FIG. 16. Like the roll joint, the pitch joint consists of two basic assemblies. These assemblies correspond in design to the first and second structural assemblies of the roll joint. The same terms, therefore, will be applied to the description of the pitch joint illustrated in FIG. 17 as are applied to the roll joint of FIG. 16.

Turning to the first structural assembly, moving from bottom to top on the right hand side in FIG. 17, there is provided an end cap 469, and end plate 470, a first outer tube 474, a frameless motor stator 478, a torque bridge 479 and a harmonic drive flexspline 480, all rigidly connected as an assembly. Also attached to the first structural assembly in the preferred embodiment are an encoder or similar measuring device 472 and a brake assembly shown generally at 476. The first structural assembly is rotatably connected to the second structural assembly via the bearings diagrammatically illustrated at 481.

A rotor shaft assembly can be seen in the interior of FIG. 17 mounted within the first structural assembly by bearing 482 and wave generator 488. The rotor shaft assembly consists of a bearing mounted shaft 484, a frameless motor rotor 486, and a harmonic drive wave generator 488, all rigidly connected as an assembly.

The second structural assembly consists of a harmonic drive rigid spline 490, a slip clutch assembly shown generally at 492 and a second outer tube 493. Also attached to the second structural assembly in the preferred embodiment are a wire tube disk 494 and a wire passage tube 496.

The pitch joint of FIG. 17 operates in the following manner. When the frameless motor stator 478 is energized, the rotor shaft assembly which consists of items 484, 486 and 488, as well as portions of the brake assembly explained below, rotate within the confines of bearing 482 and wave generator 488. Because the harmonic drive flexspline 480 is rigidly affixed to the first outer tube 474 via the torque bridge 479, the rotation of the wave generator 488 forces rotation of the rigid spline 490 relative to the first structural assembly. The rotational motion of the rigid spline 490 is transmitted via a slip clutch to the second structural assembly through the slip clutch assembly 492, thus causing rotation of the slip clutch assembly 492, the second outer tube 493, the wire tube disk 494, the wire passage tube 496 and the next adjacent joint 530.

Torque bridge 479 has mounted on its surface several strain gauges for detecting joint torque. Also, encoder 472 detects the relative rotation of the first structural assembly to the second structural assembly by monitoring the rotation of wire passage tube 496 which is communicated through the coupling represented diagrammatically at 497. These measurements are used for feedback control of the arm motion.

Both the first outer tube 474 and the second outer tube 493 include a connecting feature, shown in FIG. 17 as clamp ring regions 532 and 534, to enable the joint assembly to be connected to the next sequential manipulator joints 400 and 530.

The slip clutch assembly 492 of the pitch joint of FIG. 17 is essentially identical to that of the roll joint of FIG. 16. It consists of a retaining ring 498, a washer 500, a wave spring represented diagrammatically at 502, a wave spring spacer 504, a clutch pate spacer 508 and a clutch plate 510. The wave spring 502 applies a preset pressure against the wave spring spacer 504 and clutch plate spacer 508, thereby causing the clutch plate 510 to be pressed between the clutch plate spacer 508 and the inner clutch plate 512. The wave spring 502, washer 500 and wave spring spacer 504 are held in place by the retaining ring 498. The slip clutch assembly 492 permits relative slippage between the clutch plate 510 and the second structural assembly in the event of an overload condition.

Turning now to the brake assembly 476, there is provided a bearing and solenoid support plate 514 and bearing retainer 516 rigidly connected to the first outer tube 474. Several brake disk support members 518 are provided around the periphery and affixed to the bearing and solenoid support plate 514. A solenoid 520 is housed in the brake and solenoid support plate 514. Each of the brake disk supports 518 located around the periphery of the bearing and solenoid support plate 514 carried a spring 522. There is provided a brake disk 523 rigidly secured to the brake disk support members 518. There is also provided a clapper 524 adjacent the solenoid 520 in the shape of an annulus in which there are several apertures provided around its periphery to accommodate the brake disk support members 518. When the solenoid 520 is activated, the clapper 524 is held in contact with the solenoid 520 and the springs 522 are in comprehension. When the solenoid 520 is deactivated, the springs 522 force the clapper 524 against brake flywheel 526 which has treated contact surfaces. Brake flywheel 526 is connected to the rotor shaft assembly by brake shaft 528. Thus, the brake shaft 528 and brake flywheel 526 rotate freely at high speed with the rotor shaft assembly when the brake solenoid 520 is energized and the motor stator is energized. When the energy to the solenoid 520 is deactivated, the brake springs 522 cause the clapper 524 to exert a clamping force on the brake flywheel 526, thus halting the rotation of the rotor shaft assembly and, consequently, the relative motion of the first structural assembly to the second structural assembly of the pitch joint.

It will be apparent to those who are skilled in the art that numerous variations on the embodiment shown in FIGS. 15, 16 and 17 are possible without departing from the basic teachings of the invention. For example, the bearings 406 and 481 which separate the rotating halves of the roll joint and pitch joint could be moved to nearly any location along the joint depending upon design considerations such as mechanical forces, thermal energy dissipation and the interchangeability of internal parts between roll-type and pitch-type joint module configurations. It will be noted in the illustrated embodiments of FIGS. 15, 16 and 17 that the primary heat sources—the motor and the brake solenoid—are mounted in thermal contact with the outer surface of the joint with the bearings moved away from the motor area. This has the advantage of providing a heat sink and of providing a large surface ares for heat rejection through radiation which is the dominant mechanism in high vacuum environments like space or welding chambers. Heat rejection capabilities in atmospheric or underwater environments could be further enhanced by providing external fins or by providing internal passageways in first outer tubes 416 and 474 in the region of the motor stators 420 and 478 to accommodate force air or liquid coolant. Furthermore, in some circumstances it may be desirable to thermally insulate the first outer tubes 416 and 474 from heat sources such as motor stators 420 and 478 and brake solenoids 458 and 520 while still maintaining them in mechanical attachment. This could be done, for example, by interposing an insulating layer between the motor stators and brake solenoids and the outermost portion of the first outer tubes. This could be desirable in circumstances where thermal growth of the exoskeleton structure is a primary concern because of its potential effects on structural distortion and thus manipulator positioning accuracy. These and other variations will be apparent to those skilled in the art upon reading this disclosure.

The foregoing alternate embodiments illustrated in FIGS. 15, 16 and 17 provide numerous distinct advantages, some of which they share with the other embodiments described above. With the motor stator in direct contact with the first outer tube, heat is readily dissipated from the motor. The use of a central wire passage tube protects the wires that are passed from joint to joint and minimizes the flexing of the those wires. The unitized design results in numerous parts being interchangeable between roll joint and pitch joint, thus minimizing the total number of uniquely different parts required to build a manipulator. Using a brake on the high speed rotor shaft, as opposed to applying a brake directly between the structural assemblies, allow the use of the smallest and lightest brake due to the mechanical advantage found at that point in the mechanism. It also provides for a brake that draws little current when activated in the "off" position and thus reduces both the power requirements and the heat generation. Placing the clutch assembly adjacent the second structural assembly and away from the rotor shaft assembly protects the motor and reduction gearing assembly, which operate with high inertial forces, from damaging jolts. Placing the position feedback on the output side of the clutch ensures that the manipulator controller will have an accurate reading of position even if clutch slippage has occurred due to an overload condition. Finally, the proximity between the motor, brake and harmonic drive allows the use of only two bearings for the rotor shaft assembly, which, by eliminating the "three bearing" problem, gives smoother operation and provides means to accommodate mechanical misalignments caused by manufacturing tolerances.

As previously explained, the roll joints and pitch joints described above can be joined in alternating sequence to construct a manipulator arm with any number of arm joints. Those skilled in the art will recognize that a wide variety of arm configurations are possible with the present invention. In addition to the conventional configuration of altering pitch and roll joints, for example, a manipulator could be constructed from pitch and roll joints of the present invention in which two or more adjoining joints are of the same type, i.e. pitch or roll. Also, a simple yaw joint could be placed between two pitch and roll joints to provide motion about a vertical axis. It would also be apparent to those skilled in the art that a "dead" static joint of any shape could be substituted in the arm. Similarly, the perpendicular relationship between roll joint and pitch joint axes of rotation provided in the preferred embodiments could be altered. This wide variety of configurations is made possible and simple by the exoskeleton design of the arm segments and by the fact that each arm joint is independently powered.

Those skilled in the art will recognize that the unitized nature of the arm joints facilitates the construction of a redundant manipulator which is advantageous in operation but also problematic. Redundancy generally improves the maneuverability of the manipulator. However, to be useful, the manipulator motion must be accurately controlled and the unitized structural design makes that task more difficult. The servocontrol of the present invention is uniquely adapted to provide optimum dynamic performance and stability to a manipulator constructed of unitized arm joints such as those described above and driven by a rapid sequence of digital position error signals converted to analog signals such as those generated by digital robot controllers, examples of which can be found in U.S. Pat. Nos. 3,909,600; 3,920,972; 4,011,437; 4,403,281; and 4,453,221, the relevant contents of which are hereby incorporated by reference.

FIG. 1 includes a block representation of a representative control system 3 of an industrial robot. The control system 3 is an integral part of such a device. Without a control system 3, a manipulator arm has little utility.

As represented by FIG. 1, the representative control system 3 can be viewed for the purpose of discussion as having several discrete elements. The representative control system 3 may include an input/output console 5 to permit communication with an operator or to accommodate various process or machine inputs. It may also include a digital computer 11 which processes a user-program contained in the data memory 9 in accordance with the control programs contained in program memory 7. The user-program directs the actions of the manipulator. The control system 3 also may include analog servocontrol circuits 13 which provide communication with the arm joints and tool 16. Numerous additional peripheral devices may be included to interface the manipulator to a representative control system 3.

The operating system of a control system 3 may include a mode control program. Such programs allow for switching the control system 3 between various operating modes such as automatic mode, teach mode, manual mode, etc. During the teach mode of a typical control system, an operator uses input/output console 5 to actuate the drive motors of the various arm joints and thereby move the tool 16 into desired positions and orientations along a desired path. By so doing, the operator establishes numerous "goal points" on a path of movement which the manipulator later may follow. While numerous other operating modes may be available in a representative control system 3, only the automatic mode is of interest here since that is the primary mode involved in the use of the present invention. Operation of the automatic mode and the present invention assumes that the operator already has "taught" the manipulator control system 3 the operation it is to carry out and that the appropriate information is stored in data memory 9 of the control system 3.

The objective of the automatic mode of a typical control system 3 is to precisely control the location and orientation of a tool 16 in space. Referring to FIG. 1, the objective is to guide the motion of the manipulator so as to precisely control the location and orientation of tool 16. This is accomplished in a typical control system 3 by providing a rapid succession of digital position error signals, each the result of a complex series of computations, which are converted to analog signals and transmitted to each arm joint via analog servocontrol circuits 13. Using appropriate feedback and compensation techniques, the servocontrol circuits 13 provide a final continuous drive signal to each joint motor.

Referring again to FIG. 1, the Analog Servocontrol Circuits 13 of the present invention receive from the control system an analog position error signal and an instantaneous velocity signal for each arm joint. The Analog Servocontrol Circuits 13 amplify the position error signal and, using the instantaneous velocity signal and the torque feedback signal explained below, compensate that signal to ensure stability, thereby providing a final drive signal to each arm joint motor.

The electromechanical system of a manipulator such as that of the present invention typically is a second order or higher order feedback control system, as those terms are used in the vernacular of control engineering. As such, the electromechanical system is susceptible to operational instability if the physical characteristics of the system and the drive signals provided to the joint motors are not properly controlled.

In many servomechanisms similar to the present invention, instability problems are minimized because the mechanical drive structure is very stiff and thus its resonant frequency is very high; beyond a point of serious concern. The forward path of the control loop of such a system may be compensated (e.g. by a low frequency lag compensation network) thereby making the system behave as a first order system within the bandwidth of interest. This approach has the disadvantage of slowing the response of the servomechanism because it reduces the bandwidth of the system.

Such conventional servocontrol techniques are inappropriate with the manipulator described above. The mechanical drive system of the manipulator of the present invention is relatively compliant due to the flexibility of the harmonic drive. Consequently, the resonant frequency of the mechanical drive system is relatively low. Furthermore, the harmonic drive creates vibration and control problems that would be far less severe in a structure which used other power transmission means. That is, in addition to the typical excitation sources of drive signal frequency content and various mechanical roughnesses in the system, the harmonic drive causes sinusoidal excitation as a result of an inherent transmission deviation at the rate of n cycles per motor revolution where n is the number of lobes on the wave generators 100, 260, 430 or 488.

Because of these features, a typical servocontrol and compensation scheme consisting of a position feedback loop and a velocity feedback loop would be ineffective and sluggish if applied to the structure of the present invention. Conventional control strategies would not allow the resonance to be controlled and, in fact, may amplify the problem of the harmonic drive sinusoidal excitation.

To overcome these and related problems, the servo-controller of the present invention utilizes a torque feedback loop in addition to velocity and position feedback loops and in addition to a current loop included as part of a current amplifier. While all three feedback loops are used together in normal operation, the torque loop could be used alone for applications of the manipulator which call for application of a specified force to an object. Furthermore, the torque loop feedback control concept of the present invention could be advantageously employed in nearly any type of actuator driven mechanical apparatus; it is not limited to the revolute manipulator described above. By using the torque loop as the innermost loop, the motor and harmonic drive configuration of each arm joint operates as a torque producing plant rather than a motion producing plant. The torque feedback loop not only remedies the sinusoidal excitation to the structure which otherwise would be induced by the harmonic drive, it also improves the response of the servomechanism because it permits the position and velocity feedback loops to operate in a frequency range far beyond what would otherwise be possible. The use of the torque loop also significantly reduces the effects of friction and compliance in the servomechanism, enabling the present invention to operate with much greater accuracy and repeatability. Furthermore, the torque loop feedback improves the operating characteristics of the manipulator even when mounted on a soft foundation.

Figure 9:
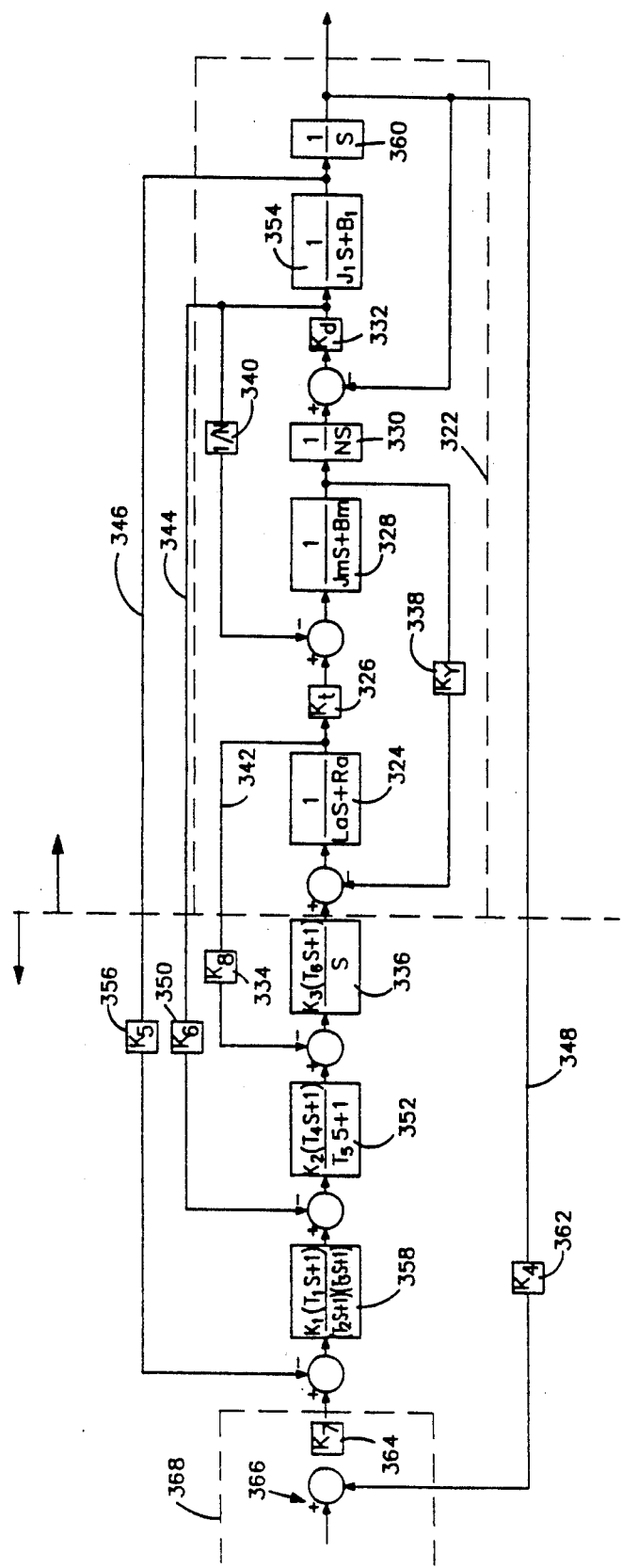
FIG. 9 is a block diagram of the system comprising the manipulator, a digital controller, and the servocontrol circuits.

FIG. 9 is a block diagram of the present invention including the servocontrol elements. Each block of the block diagram contains the transfer function of the associated mechanical, electrical or electromechanical element of the entire system expressed as Laplace transforms. The symbols which correspond directly to physical properties of the portion of the system whose operation is being controlled are defined below.

$L_a$—Armature Inductance
$L_a$—Armature Resistance
$K_t$—Motor Torque Constant
$J_m$—Motor and Wave Generator Inertia
$B_m$—Motor and Wave Generator Viscous Friction
$K_v$—Voltage Constant
N—Drive Ratio
$K_d$—Drive Spring Constant
$J_1$—Joint Inertia
$B_1$—Joint Viscous Friction Those skilled in the art will recognize that the same or equivalent compensation systems could be represented by block diagrams different from that shown in the figure.

For simplicity, the portion of the block diagram contained within phantom box 322 may be viewed as the primary physical system of a single arm joint controlled by the servocontroller of the present invention. Blocks 324 and 326 represent the armature inductance and resistance and the torque constant of the drive motor, respectively. Block 328 represents the inertia and viscous friction of the drive motor and the harmonic drive wave generator. Block 330 represents the gear ratio of the harmonic drive and the time integration of velocity to position. Block 332 represents the spring constant associated with the harmonic drive and the other power transmission components leading up to the point where the strain gauges are applied.

Blocks 334, 336, and 338 and the associated feedback lines represent dynamic characteristics of a typical current amplifier/motor combination. Block 340 represents the axis torque reflected through the gear ratio to the motor.

As shown in the figure, the servocontrol of the present invention uses forward path compensation. Compensation also could be accomplished by placing compensation networks in the feedback loops to achieve the same functions.

As previously state, the servocontrol of the present invention uses four feedback loops—a current loop 342, a torque loop 344, a velocity loop 346, and a position loop 348. The torque loop 344 represents the torque feedback. Block 350 represents the gain of the feedback transducer which is proportional to the torque in the drive at the point where the harmonic drive connects to the arm joint. Block 352 represents the torque loop compensation network.

Block 354 represents the inertia and friction of the manipulator arm segment. Velocity loop 346 represents the arm segment velocity feedback. Block 356 represents the gain of the velocity feedback transducer which is proportional to the velocity of the arm segment. Block 358 represents the velocity loop compensation network.

Finally, Block 360 represents the time integration of velocity to position. Block 362 is the gain of the position feedback transducer and 364 represents a gain in the forward path which determines the speed of response of the position loop. The arrow 366 represents the commanded position signal. The portion of the block diagram contained within the phantom box 368 represents functions which are performed in the digital portion of the controller 15.

Those skilled in the art will recognize that numerous alternative circuits and control schemes could be developed to accomplish the torque, velocity, and position and current feedback control of the present invention using conventional compensation design techniques such as those explained in Ogata, *Modern Control Engineering*, Prentice-Hall Inc. 1970, the relevant portion of which are incorporated herein by reference. If desired, for example, the values of the block diagram terms associated with the electromechanical system of each joint can be determined experimentally and used to mathematically derive an appropriate compensation network. Alternatively, the frequency response and phase characteristics of the portion of the system to be controlled can be experimentally determined and graphically represented by Bode plots, which would form the basis for design of appropriate forward path or feedback path compensation networks. Other design methods also could be employed.

Figure 10:
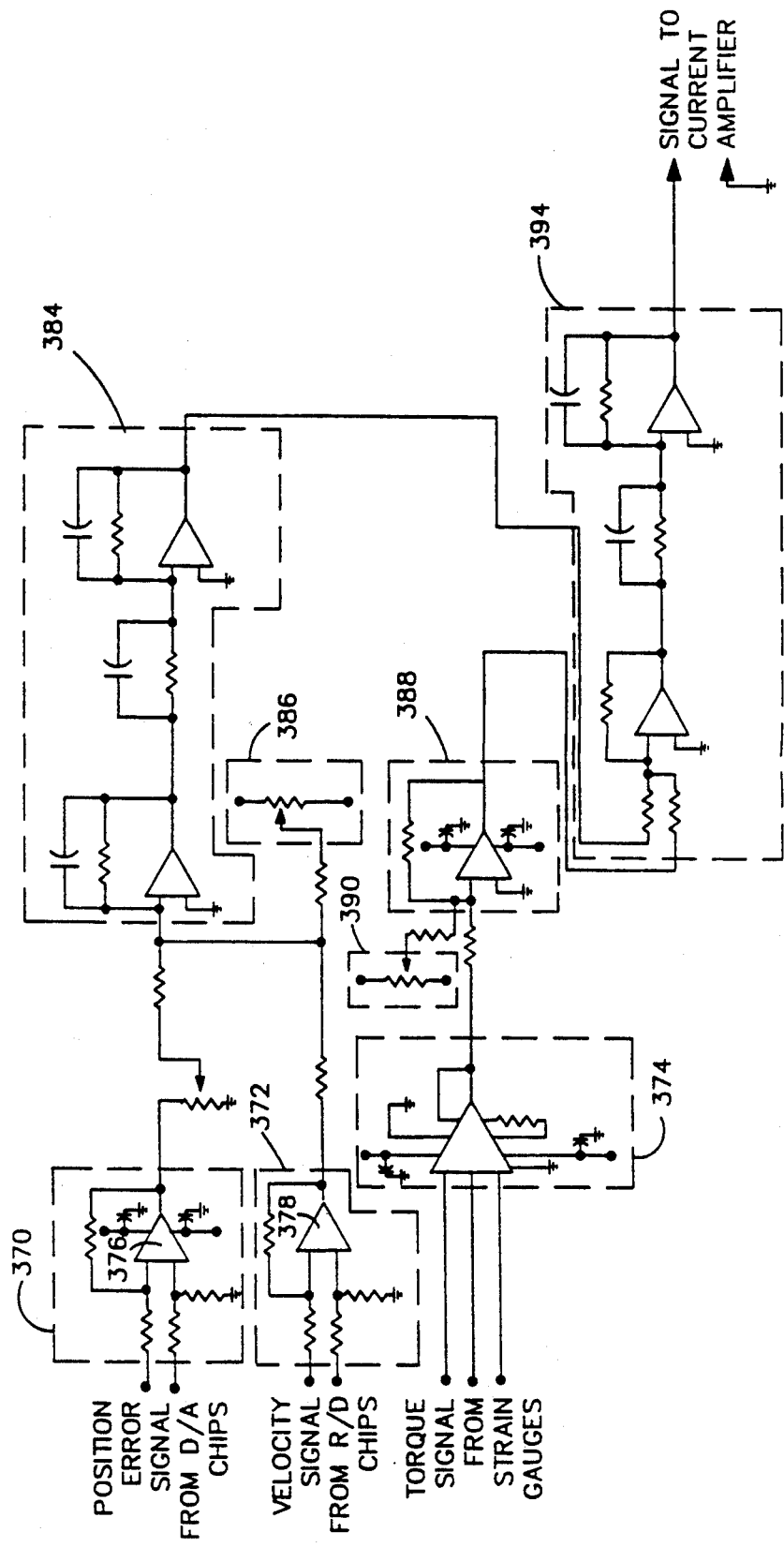
FIG. 10 is a schematic diagram of the servocontrol circuits of the present invention.
Figure 11:
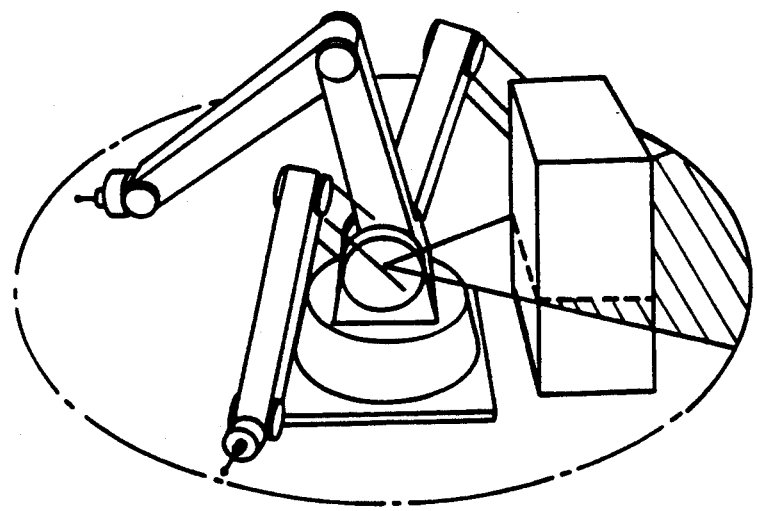
FIG. 11 is an illustration of the maneuverability limitations of a typical jointed-arm manipulator.
Figure 12:
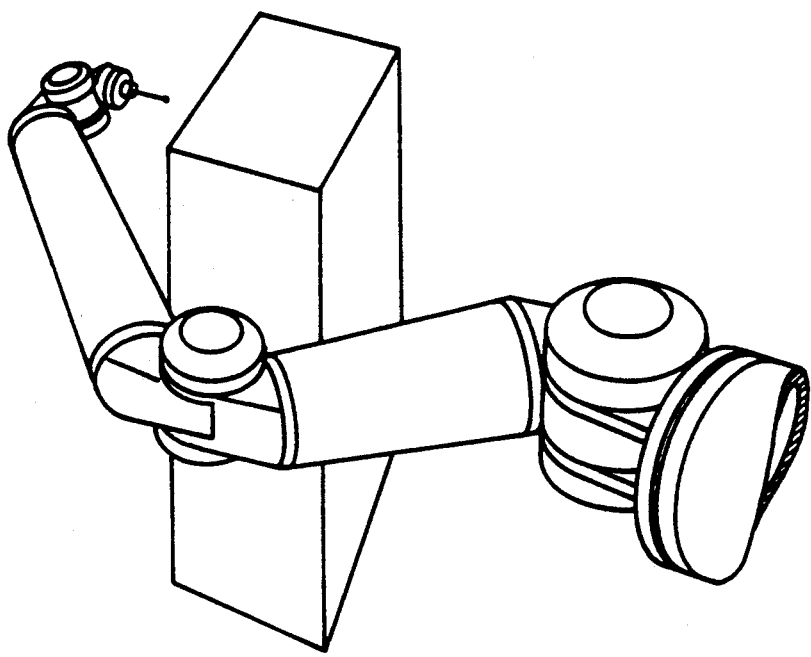
FIG. 12 is an illustration of the maneuverability features of the present invention.
Figure 13:
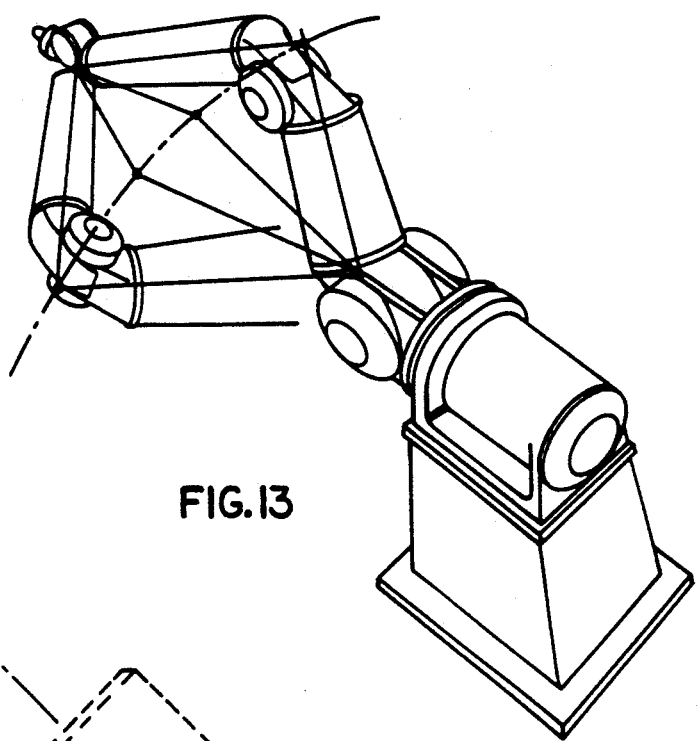
FIG. 13 is an illustration of the ability of the present invention to "orbit" the "elbow" of the manipulator out of a fixed plane of operation.
Figure 14:
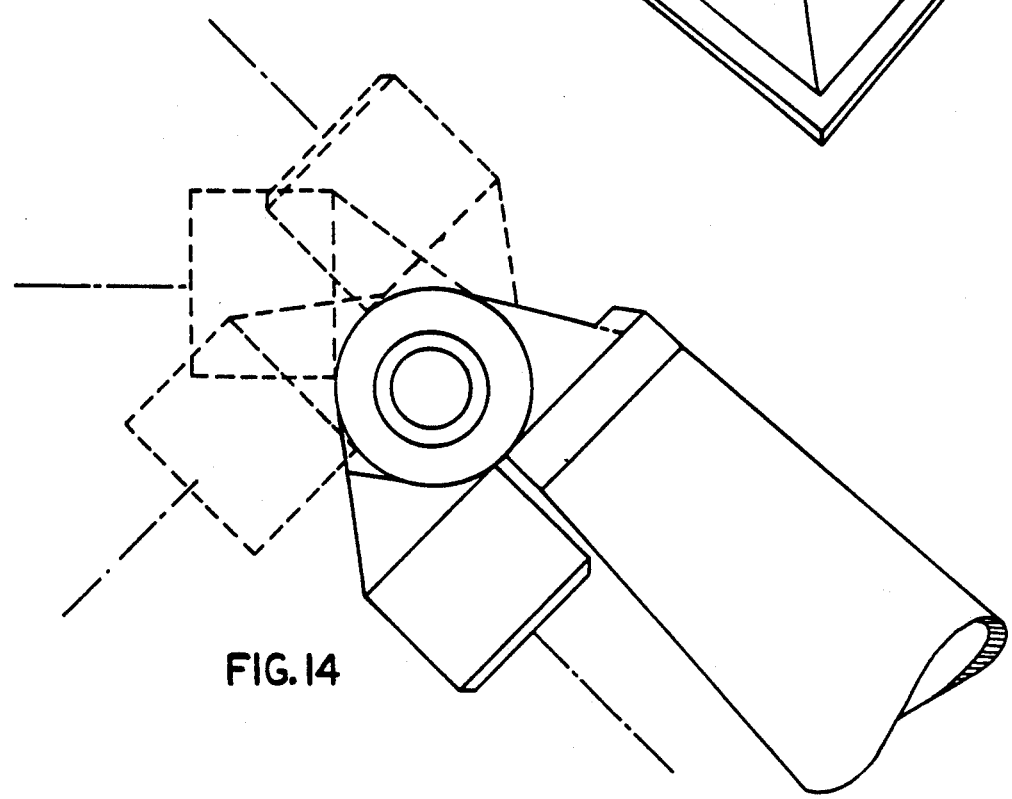
FIG. 14 is an illustration of the ability of adjacent roll joints of the present invention to fold back to a parallel position.

The preferred embodiment of the servocontrol circuitry of the present invention is schematically illustrated in FIG. 10. For descriptive purposes, the schematic diagram may be logically divided into several portions outlined by the phantom boxes.

As indicated in the block diagram of FIG. 9 and shown in FIG. 10, the circuitry receives a position error signal from the D/A chips, a velocity signal from the R/D chips and a torque signal from the strain gauges. The position error signal is supplied to a differential amplifier shown in phantom box 370. Likewise, the velocity signal and torque signal are supplied to the differential amplifier and instrumentation amplifier shown in phantom boxes 372 and 374, respectively. Each of the differential amplifiers 370 and 372 includes an operational amplifier, indicated at 376 and 378, and an array of one or more resistors and capacitors. Instrumentation amplifier 374 is designed to provide greater gain than amplifiers 370 and 372 because the signals received from the strain gauges are quite small.

The signal provided by the differential amplifiers 370 and 372 is supplied to the velocity loop compensation network shown in phantom box 384 and adjusted by balance 386. Balance 386 permits the circuitry to be adjusted to provide zero output when there is zero position error.

The velocity loop compensation network 384 consists of a lag network of a particular type known as a lag-lead-lag network. A low frequency lag, consisting of an operational amplifier, resistor and capacitor, is provided to increase the signal gain at low frequencies, thus improving the static stiffness of the manipulator. This is followed by a medium frequency lead network, consisting of a resistor and capacitor, to improve stability and reduce overshoot of the manipulator. Finally, a high frequency lag network, consisting of an operational amplifier, resistor and capacitor, is provided as a filter. A velocity loop compensation network consisting of only a lag network or only a lag-lead network would also be functional but would not be as effective as the lag-lead-lag network illustrated.

The amplified torque signal from differential amplifier 374 is supplied to the lag network consisting of an operational amplifier, resistors and capacitors shown in phantom box 388 and is adjusted by balance 390. This network serves as a high frequency filter. The resulting signal is supplied to the torque loop compensation network shown in phantom box 394.

The torque loop compensation network 394 consists of a lead network of a particular type known as a lead-lag, preceded by a differential amplifier. A low frequency lead, consisting of a resistor and capacitor receives the signal from a differential amplifier. This is followed by a lag network consisting of an operational amplifier, resistor and capacitor. The resulting signal is supplied to a conventional current amplifier which produces the final drive signal to the joint motor. The purpose and effect of the torque loop compensation network is to alter the frequency response and phase characteristics of the open loop forward path to avoid a condition of instability and to maximize the operational bandwidth of this inner-most feedback loop. By maximizing the operational bandwidth of the torque loop, the bandwidth of the velocity and position loops are permitted to be higher than would otherwise be possible, thus improving the speed of response of the manipulator.

The values of the network components are determined experimentally or by mathematical or computer modeling. The values are unique for each structure being controlled. Therefore, the values are not indicated here.

The foregoing description of a preferred embodiment and alternative embodiments of the invention have been presented for purposes of illustration and description. The description is not intended to be exhaustive or to limit the invention to the precise form disclosed. Obviously, many modifications and variations are possible in light of the above teaching. The embodiment presented above was chosen and described in order to best explain the principles of the invention and its practical application to thereby enable others skilled in the art to best utilize the invention in various embodiments and with various modifications as are suited to the particular use contemplated.

What is claimed is:

1. A self-contained pitch joint comprising: and ear module, including
    a bell portion and at least two parallel ears extending from said bell portion, each ear defining substantially concentric apertures;
    a case module, including
    a bell portion and a substantially tubular portion extending from said bell portion and positioned between said ears;
    at least two bearings positioned to permit relative rotation between said ear module and said case module;
    a reduction gearing drive means rigidly affixed to a first one of said ears of said case module;
    a means, rigidly affixed to said reduction gearing means, for clutchably communicating rotational movement between said reduction gearing means and a second of said ears of said case module;
    a means, responsive to the rotational force between said ear module and said case module for producing a first signal; and
    a means responsive to the rotational movement between said ear module and said case module for producing a second signal.

2. A self-contained pitch joint according to claim 1 wherein said reduction gearing means comprises:
    ring gear attached to one of said ears of said case module;
    a flexspline attached to the other of said ear or case modules and positioned within said ring gear to engage said ring gear;
    a wave generator positioned inside said flexspline; and means for rotating said wave generator.

3. A self-contained pitch joint comprising:
    an ear module, including
    a bell portion and two or more parallel ears extending from said bell portion, each ear defining substantially concentric apertures;
    a case module, including
    a bell portion and a substantially tubular portion extending from said bell portion and positioned between said ears;
    two or more bearings positioned to permit relative rotation between said ear module and said case module;
    a reduction gearing drive means rigidly affixed to said case module;
    a means, rigidly affixed to said reduction gearing means, for clutchably communicating rotational movement between said reduction gearing means and said ear module;
    a means responsive to the rotational movement between said ear module and said case module for producing a second signal.

4. A self-contained pitch joint according to claim 3 wherein said reduction gearing means comprises:
    a ring gear rigidly affixed to the interior of said tubular portion of said case module;
    a flexspline positioned within said ring gear to engage said ring gear;
    a wave generator positioned inside said flexspline and said ring gear; and
    a means for rotating said wave generator relative to said ring gear.

5. A self-contained pitch joint according to claim 4 wherein said clutchable communication means comprises:
    a clutch plate rigidly attached to said flexspline;
    a clutch member rigidly attached to said ear module; and
    adjustable means for producing frictional resistance to relative rotation between said clutch plate and said clutch member.

6. A self-contained pitch joint according to claim 1 wherein said force signal producing means comprises:
    a thin-walled section provided in at least one location on said clutchable communication means; and
    at least one signal producing means, responsive to distortion, mounted on said thin-walled section.

7. A self-contained pitch joint according to claim 2 wherein said force signal producing means comprises:
    a thin-walled section provided in at least one location on said clutchable communication means; and
    at least one signal producing means, responsive to distortion, mounted on said thin-walled section.

8. A self-contained pitch joint according to claim 3 wherein said force signal producing means comprises:
    a thin-walled section provided in at least one location on said clutchable communication means; and at least one signal producing means, responsive to distortion, mounted on said thin-walled section.

9. A self-contained pitch joint according to claim 4 wherein said force signal producing means comprises:
a thin-walled section provided in at least one location on said clutchable communication means; and
at least one signal producing means, responsive to distortion, mounted on said thin-walled section.

10. A self-contained pitch joint according to claim 1 wherein said force signal producing means comprises:
a thin-walled section provided in at least one location on said clutchable communication means; and
at least one signal producing means, responsive to distortion, mounted on said thin-walled section.

11. A self-contained pitch joint according to claim 1 wherein said movement signal producing means comprises:
a reference ring gear mounted either to said case module or said ear module; and
a means mounted to the other of said case module or said ear module and engaged to said reference ring gear, for producing said signal responsive to the relative movement between said signal producing means and the reference ring gear.

12. A self-contained pitch joint according to claim 2 wherein said movement signal producing means comprises:
a reference ring gear mounted either to said case module or said ear module; and
a means, mounted to the other of said case module or said ear module and engaged to said reference ring gear, for producing said signal responsive to the relative movement between said signal producing means and the reference ring gear.

13. A self-contained pitch joint according to claim 3 wherein said movement signal producing means comprises:
a reference ring gear mounted either to said case module or said ear module; and
a means, mounted to the other of said case module or said ear module and engaged to said reference ring gear, for producing said signal responsive to the relative movement between said signal producing means and the reference ring gear.

14. A self-contained pitch joint according to claim 4 wherein said movement signal producing means comprises:
a reference ring gear mounted either to said case module or said ear module; and
a means, mounted to the other of said case module or said ear module and engaged to said reference ring gear, for producing said signal responsive to the relative movement between said signal producing means and the reference ring gear.

15. A self-contained pitch joint according to claim 5 wherein said movement signal producing means comprises:
a reference ring gear mounted either to said case module or said ear module; and
a means, mounted to the other of said case module or said ear module and engaged to said reference ring gear, for producing said signal responsive to the relative movement between said signal producing means and the reference ring gear.

16. A self-contained pitch joint according to claim 6 wherein said movement signal producing means comprises:
a reference ring gear mounted either to said case module or said ear module; and
a means, mounted to the other of said case module or said ear module and engaged to said reference ring gear, for producing said signal responsive to the relative movement between said signal producing means and the reference ring gear.

17. A self-contained pitch joint according to claim 8 wherein said movement signal producing means comprises:
a reference ring gear mounted either to said case module or said ear module; and
a means, mounted to the other of said case module or said ear module and engaged to said reference ring gear, for producing said signal responsive to the relative movement between said signal producing means and the reference ring gear.

18. A self-contained pitch joint according to claim 9 wherein said movement signal producing means comprises:
a reference ring gear mounted either to said case module or said ear module; and
a means, mounted to the other of said case module or said ear module and engaged to said reference ring gear, for producing said signal responsive to the relative movement between said signal producing means and the reference ring gear.

19. A self-contained pitch joint according to claim 10 wherein said movement signal producing means comprises:
a reference ring gear mounted either to said case module or said ear module; and
a means, mounted to the other of said case module or said ear module and engaged to said reference ring gear, for producing said signal responsive to the relative movement between said signal producing means and the reference ring gear.

20. A self-contained roll joint comprising:
an external structural shell;
an internal structural shell co-axial with said external shell;
two or more bearings positioned to permit relative rotation between said external shell and said internal shell;
a reduction gearing drive means rigidly affixed to a first one of said shells;
a means, rigidly affixed to said reduction gearing drive means, for clutchably communicating rotational movement of said reduction gearing means to a second one of said shells;
a means responsive to the rotational force between said external shell and said internal shell for producing a first signal; and
a means responsive to the rotational movement between said external shell and said internal shell for producing a second signal.

21. A self-contained roll joint according to claim 20 wherein said reduction gearing means comprises;
a ring gear attached to a first one of said shells;
a flexspline attached to a second of one of said shells and positioned to engage said ring gear;
a wave generator positioned inside said flexspline; and
a means for rotating said wave generator.

22. A self-contained roll joint comprising:
an external structural shell;
an internal structural shell co-axial with said external shell;

two or more bearings positioned to permit relative rotation between said external shell and said internal shell;

a reduction gearing drive means rigidly affixed to said internal shell;

a means, rigidly affixed to said reduction gearing means, for clutchable communicating rotational movement of said reduction gearing means to said external shell;

a means responsive to the rotational force between said external shell and said internal shell for producing a force signal;

a means responsive to the rotational movement between said external shell and said internal shell for producing a second signal.

23. A self-contained roll joint according to claim 22 wherein said reduction gearing means comprises:

a ring gear rigidly affixed to the interior of said internal shell;

a flexspline positioned on the interior of said internal shell to engage said ring gear;

a wave generator positioned inside said flexspline and said ring gear; and a means for rotating said wave generator relative to said ring gear.

24. A self-contained roll joint according to claim 23 wherein said clutchable communication means comprises:

a clutch plate rigidly attached to said flexspline;

a clutch member rigidly attached to said external shell; and adjustable means for producing frictional resistance to relative rotation between said clutch plate and said clutch member.

25. A self-contained roll joint according to claim 20 wherein said force signal producing means comprises:

a thin-walled section provided in at least one location on said clutchable communication means; and at least one signal producing means responsive to distortion mounted on said thin-walled section.

26. A self-contained roll joint according to claim 21 wherein said force signal producing means comprises:

a thin-walled section provided in at least one location on said clutchable communication means; and at least one signal producing means responsive to distortion mounted on said thin-walled section.

27. A self-contained roll joint according to claim 22 wherein said force signal producing means comprises:

a thin-walled section provided in at least one location on said clutchable communication means; and at least one signal producing means responsive to distortion mounted on said thin-walled section.

28. A self-contained roll joint according to claim 23 wherein said force signal producing means comprises:

a thin-walled section provided in at least one location on said clutchable communication means; and at least one signal producing means responsive to distortion mounted on said thin-walled section.

29. A self-contained roll joint according to claim 24 wherein said force signal producing means comprises:

a thin-walled section provided in at least one location on said clutchable communication means; and at least one signal producing means responsive to distortion mounted on said thin-walled section.

30. A self-contained roll joint according to claim 24 wherein said signal producing means is a strain gauge.

31. A self-contained pitch joint according to claim 20 wherein said movement signal producing means comprises:

a reference ring gear mounted to one of said internal shell or external shell; and a means, mounted to the opposite of said external shell or internal shell, and engaged to said reference ring gear, for producing said signal responsive to the relative movement between said signal producing means and the reference ring gear.

32. A self-contained pitch joint according to claim 21 wherein said movement signal producing means comprises:

a reference ring gear mounted to one of said internal shell or external shell; and a means, mounted to the opposite of said external shell or internal shell, and engaged to said reference ring gear, for producing said signal responsive to the relative movement between said signal producing means and the reference ring gear.

33. A self-contained pitch joint according to claim 22 wherein said movement signal producing means comprises:

a reference ring gear mounted to one of said internal shell or external shell; and a means, mounted to the opposite of said external shell or internal shell and engaged to said reference ring gear, for producing said signal responsive to the relative movement between said signal producing means and the reference ring gear.

34. A self-contained pitch joint according to claim 23 wherein said movement signal producing means comprises:

a reference ring gear mounted to one of said internal shell or external shell; and a means, mounted to the opposite of said external shell or internal shell and engaged to said reference ring gear, for producing said signal responsive to the relative movement between said signal producing means and the reference ring gear.

35. A self-contained pitch joint according to claim 24 wherein said movement signal producing means comprises:

a reference ring gear mounted to one of said internal shell or external shell; and a means, mounted to the opposite of said external shell or internal shell and engaged to said reference ring gear, for producing said signal responsive to the relative movement between said signal producing means and the reference ring gear.

36. A self-contained pitch joint according to claim 25 wherein said movement signal producing means comprises:

a reference ring gear mounted to one of said internal shell or external shell; and a means, mounted to the opposite of said external shell or internal shell and engaged to said reference ring gear, for producing said signal responsive to the relative movement between said signal producing means and the reference ring gear.

37. A self-contained pitch joint according to claim 26 wherein said movement signal producing means comprises:

a reference ring gear mounted to one of said internal shell or external shell; and a means, mounted to the opposite of said external shell or internal shell and engaged to said reference ring gear, for producing said signal responsive to the relative movement between said signal producing means and the reference ring gear.

38. A self-contained roll joint according to claim 24 wherein said movement signal producing means comprises:
- a reference ring gear mounted to one of said internal shell or external shell; and
- a means, mounted to the opposite of said external shell or internal shell and engaged to said reference ring gear, for producing said signal responsive to the relative movement between said signal producing means and the reference ring gear.

39. A self-contained roll joint according to claim 25 wherein said movement signal producing means comprises:
- a reference ring gear mounted to one of said internal shell or external shell; and
- a means, mounted to the opposite of said external shell or internal shell and engaged to said reference ring gear, for producing said signal responsive to the relative movement between said signal producing means and the reference ring gear.

40. An electromechanical joint comprising:
- first and second substantially cylindrical structural assemblies rotatably connected about a substantially single axis of assembly rotation;
- an electrically operable motor stator mechanically attached to said first assembly and in thermal communication with a heat dissipator;
- a rotor shaft concentrically mounted within said stator wherein the axis of rotation of said rotor shaft is substantially colinear to said axis of assembly rotation;
- a transmission device including a reduction gearing assembly having a higher speed element and a lower speed element to impart relative rotation between said first assembly and said second assembly about said axis of rotation when said motor is activated; and
- a detector of motive force situated in communication with said lower speed element.

41. An electromechanical joint according to claim 40 wherein said transmission means includes a harmonic drive assembly.

42. An electromechanical joint according to claim 40 further comprising an mechanical torque limiter.

43. An electromechanical joint according to claim 42 wherein said transmission means includes a harmonic drive assembly.

44. An electromechanical joint according to claim 42 wherein said mechanical torque limiter is situated between said transmission device and said second assembly.

45. An electromechanical joint according to claim 43 wherein said mechanical torque limiter is situated between said transmission device and said second assembly.

46. An electromechanical joint according to claim 40 further comprising a tubular passageway internal to said rotor shaft for transmitting motion of said second assembly to a measurement device on said first assembly.

47. An electromechanical joint according to claim 46 wherein said transmission means includes a harmonic drive assembly.

48. An electromechanical joint according to claim 46 further comprising an mechanical torque limiter.

49. An electromechanical joint according to claim 48 wherein said transmission means includes a harmonic drive assembly.

50. An electromechanical joint according to claim 48 wherein said mechanical torque limiter is situated between said transmission device and said second assembly.

51. An electromechanical joint according to claim 49 wherein said mechanical torque limiter is situated between said transmission device and said second assembly.

52. An electromechanical joint according to claim 40 further comprising a brake attached to said rotor shaft.

53. An electromechanical joint according to claim 40 further comprising a relative motion detector between said first and second assemblies.

54. An electromechanical joint according to claim 40 further comprising a quick release means for attachment to an adjacent joint.

55. An electromechanical joint according to claim 40 wherein said motor is a frameless motor.

* * * * *